(12) United States Patent  (10) Patent No.: US 7,394,955 B2
Hata  (45) Date of Patent: Jul. 1, 2008

(54) OPTICAL COMPONENT AND METHOD OF MANUFACTURING THE SAME

(75) Inventor: Kenjiro Hata, Tokyo (JP)

(73) Assignee: TDK Corporation, Tokyo (JP)

(*) Notice: Subject to any disclaimer, the term of this patent is extended or adjusted under 35 U.S.C. 154(b) by 317 days.

(21) Appl. No.: 11/231,817

(22) Filed: Sep. 22, 2005

(65) Prior Publication Data

US 2006/0067629 A1 Mar. 30, 2006

(30) Foreign Application Priority Data

Sep. 30, 2004 (JP) ............................ 2004-286560

(51) Int. Cl.
*G02B 6/26* (2006.01)
(52) U.S. Cl. ............................ 385/52; 385/53; 385/65; 385/34; 385/83
(58) Field of Classification Search .................. 385/31, 385/33, 34, 38, 52, 39, 65, 71, 73, 74, 76, 385/77, 83, 129, 89, 139, 129.49, 139.53
See application file for complete search history.

(56) References Cited

U.S. PATENT DOCUMENTS

| 4,701,011 | A | | 10/1987 | Emkey et al. | ............. | 385/34 X |
| 5,557,695 | A | * | 9/1996 | Yamane et al. | ................. | 385/49 |
| 5,859,942 | A | * | 1/1999 | Ueda | ........................... | 385/49 |
| 6,253,004 | B1 | * | 6/2001 | Lee et al. | ...................... | 385/31 |
| 6,345,138 | B1 | * | 2/2002 | Kawai et al. | .................. | 385/49 |
| 6,952,513 | B2 | * | 10/2005 | Murphy et al. | ................ | 385/52 |
| 7,269,317 | B2 | * | 9/2007 | Blauvelt et al. | ............... | 385/50 |
| 2003/0228110 | A1 | * | 12/2003 | Murphy et al. | ................ | 385/52 |

FOREIGN PATENT DOCUMENTS

JP  A-2004-157318  6/2004  ............... 385/52 X

* cited by examiner

*Primary Examiner*—Brian M Healy
(74) *Attorney, Agent, or Firm*—Oliff & Berridge, PLC

(57) ABSTRACT

The invention relates to an optical component including an optical fiber with a lens constituted by a single-mode optical fiber and a graded index optical fiber and a method of manufacturing the same. The invention provides an optical component in which an optical fiber with a lens can be accurately mounted on a substrate and which has high performance and highly stable manufacturability.

An optical component has three V-shaped grooves for disposing optical fibers. An optical fiber with a lens is disposed in each of the V-shaped grooves. The optical component has a positioning mark using for positioning optical fiber connecting surfaces. The positioning mark extending across the V-shaped grooves in an orthogonal relationship therewith is provided. The positioning mark is formed line a concave groove and is visually perceived as two parallel straight lines when viewed in a direction normal to the surface on which the V-shaped grooves are formed. The optical fiber connecting surfaces are positioned between the two parallel straight lines.

17 Claims, 20 Drawing Sheets

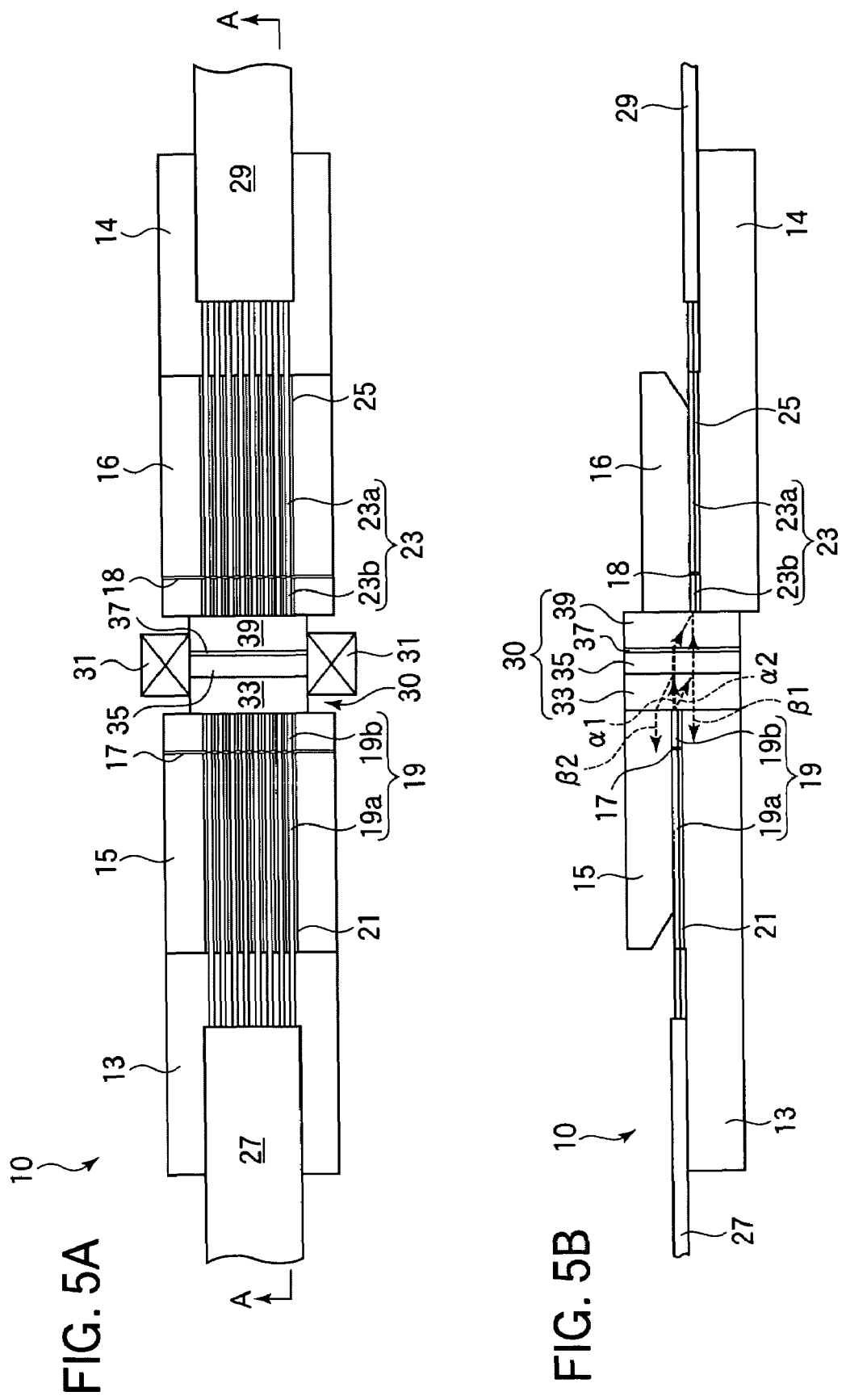

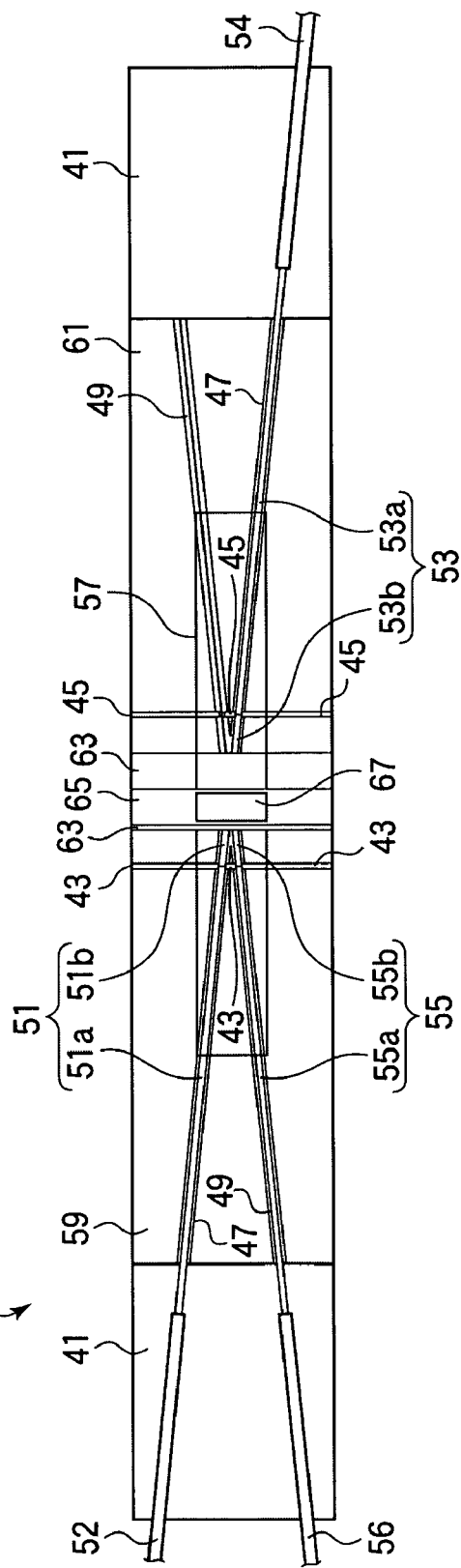
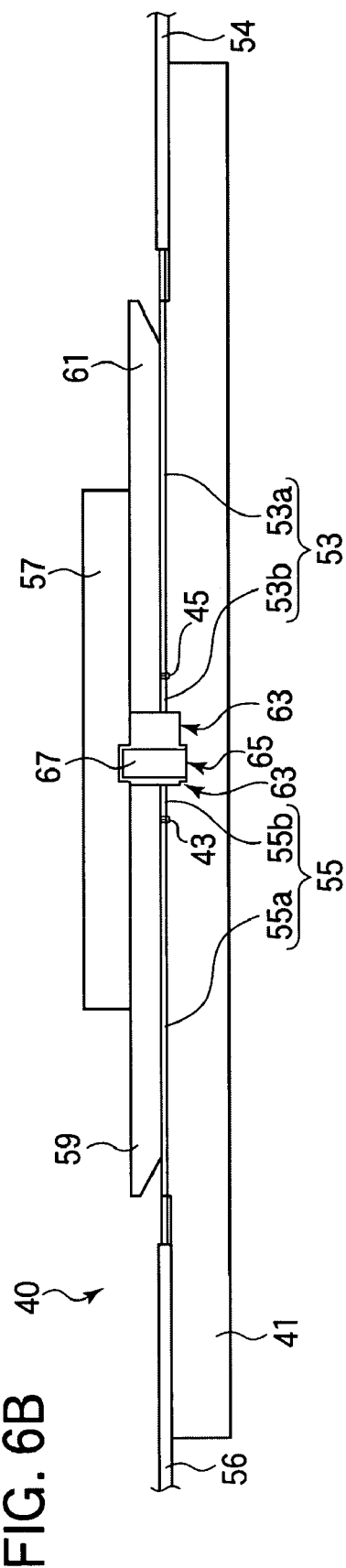
FIG. 6A
FIG. 6B

FIG. 19

| ANGLE OF V-SHAPED GROOVE (OPTICAL FIBER WITH A LENS) (°) | PROCESSING POSITION OF FIRST AND SECOND POSITIONING MARKS (μm) | | | GROOVE WIDTH OF EXPOSING GROOVE (μm) | | | DISTANCE BETWEEN EXPOSING GROOVE AND OPTICAL FILTER (μm) | THICKNESS OF OPTICAL ELEMENT SUBSTRATE (μm) | THIN FILM THICKNESS (μm) | OPTICAL FILTER THICKNESS (μm) |
|---|---|---|---|---|---|---|---|---|---|---|
| θ | L1 | L2 | L1+L2 | L3 | L4 | L3+L4 | L5 | L6 | L7 | L6+L7 |
| 5.8 | 1519 | 1543 | 3062 | 723 | 747 | 1470 | 40 | 705 | 17 | 722 |

OPTICAL COMPONENT AND METHOD OF MANUFACTURING THE SAME

BACKGROUND OF THE INVENTION

1. Field of the Invention

The present invention relates to an optical component having an optical fiber with a lens constituted by a single-mode optical fiber and a graded index optical fiber and a method of manufacturing the same.

2. Description of Related Art

Optical multiplexers/demultiplexers are used for wavelength division multiplex (WDM) communication in the field of optical communication. An optical multiplexer/demultiplexer is an optical component utilizing an optical fiber with a lens (optical fiber collimator) constituted by a single-mode optical fiber (hereinafter referred to as an SMF) and a graded index optical fiber (hereinafter referred to as a GIF).

In the case of an optical component such as an optical multiplexer/demultiplexer according to the related art, each of constituent parts such as a lens, an optical fiber, and optical elements is independently formed in a predetermined configuration in advance, and an optical axis aligning operation (active aligning) is performed to adjust the positions of the constituent parts while passing light through them. After the constituent parts are adjusted to the respective optimum positions, fixing operation is performed so as to hold the constituent parts at the respective optimum positions. As a result, there is a need for a great number of members, jigs, and facilities to hold the constituent parts, which constitutes a factor that can increase the cost of the optical component.

Patent Document 1 discloses a polarization-independent optical isolator as an optical component. The polarization-independent optical isolator includes a substrate formed with a V-shaped groove for setting an optical fiber with a lens and a recess which is orthogonal to the V-shaped groove and in which an isolator block is disposed. Thus, the number of components of the polarization-independent optical isolator can be very small, and an optical axis aligning operation for the same can be simple.

Patent Document 1: JP-A-2004-157318

Once an optical fiber with a lens is mounted on a substrate, it is difficult to adjust the position of the same thereafter. For this reason, in order to provide a polarization-independent optical isolator with high performance, the initial positioning of the optical fiber with a lens on the substrate must be performed with high accuracy. Unless the optical fiber with a lens is formed with high accuracy, it is difficult to provide the polarization-independent optical isolator with sufficiently high performance.

As thus described, in order to improve the performance of optical components of a polarization-independent optical isolator or the like, it is necessary to secure an optical fiber with a lens formed with high accuracy after positioning it with high accuracy. It is therefore difficult to manufacture the optical component with high performance, and a problem arises in that the cost of an optical component becomes high because of low yield of manufacture of the same.

SUMMARY OF THE INVENTION

It is an object of the invention to provide an optical component and a method of manufacturing the same, in which an optical fiber with a lens can be mounted on a substrate with high accuracy to achieve high performance and stability of manufacture.

The above-described object is achieved by an optical component characterized in that it includes:

a substrate;

an optical fiber setting groove formed on the substrate to allow an optical fiber to be set therein;

an optical fiber with a lens provided by connecting a single-mode optical fiber and a graded index optical fiber on an optical fiber connecting surface in the optical fiber setting groove; and a positioning mark which is formed on the substrate across the optical fiber setting groove and which is used for positioning the optical fiber connecting surface.

The invention provides an optical component according to the above invention, characterized in that it includes a plurality of the optical fiber setting grooves and in that the positioning mark is formed across the plurality of the optical fiber setting grooves.

The invention provides an optical component according to the above invention, characterized in that the positioning mark is formed like a groove.

The above-described object is achieved by an optical component, characterized in that it includes:

a substrate;

a first optical fiber setting groove for setting an optical fiber formed on the substrate along a first imaginary straight line in the plane of the substrate;

a second optical fiber setting groove formed on the substrate along a second imaginary straight line extending across the first imaginary straight line in the plane of the substrate;

a first positioning mark formed on the substrate at a predetermined distance from the intersection between the first and the second imaginary straight lines so as to extend across the first and the second optical fiber setting grooves;

a second positioning mark extending across the first and the second optical fiber setting grooves on the substrate at a predetermined distance from the intersection, the second positioning mark being disposed on the opposite side of the first positioning mark with respect to the intersection and in substantially parallel and face-to-face relationship with the first positioning mark;

three optical fibers with a lens provided by connecting a single-mode optical fiber and a graded index optical fiber on an optical fiber connecting surface and set in the first and the second optical fiber setting grooves with an end face of the graded index optical fiber directed toward the intersection, the optical fibers including a first optical fiber with a lens positioned based on the first positioning mark and set in the first optical fiber setting groove, a second optical fiber with a lens positioned based on the second positioning mark and set in the first optical fiber setting groove, and a third optical fiber with a lens positioned based on a first positioning mark and set in the second optical fiber setting groove;

an exposing groove which is provided in a position at a predetermined distance from the first positioning mark so as to include the intersection and in which an end face of the graded index optical fiber of each of the first to third optical fibers with a lens is exposed in a position at a predetermined distance from the optical fiber connecting surface; and an optical element set in the exposing groove to multiplex or demultiplex light which has propagated in and exited the first to third optical fibers with a lens.

The invention provides an optical component according to the above invention, characterized in that the first and the second positioning marks are formed like a groove.

The above-described object is achieved by a method of manufacturing an optical component characterized in that it includes the steps of:

forming an optical fiber setting groove for setting an optical fiber on a substrate;

forming a positioning mark on the substrate across the optical fiber setting groove;

setting an optical fiber with a lens provided by connecting a single-mode optical fiber and a graded index optical fiber on an optical fiber connecting surface in the optical fiber setting groove; and positioning the optical fiber connecting surface based on the positioning mark.

The invention provides a method of manufacturing an optical component according to the above invention, characterized in that it includes the step of cutting the graded index optical fiber in a position at a predetermined distance from the optical fiber connecting surface based on the positioning mark after the optical fiber connecting surface is positioned.

The invention provides a method of manufacturing an optical component according to the above invention, characterized in that the positioning mark is formed like a groove.

The invention provides a method of manufacturing an optical component according to any of the above invention, characterized in that the positioning mark is formed as two parallel straight lines sandwiching a boundary of the optical fiber connecting surface.

The invention provides a method of manufacturing an optical component according to the above invention, characterized in that the optical fiber connecting surface is positioned in the gap between the two parallel straight lines.

The invention provides a method of manufacturing an optical component according to above invention, characterized in that it includes the steps of:

forming a plurality of the optical fiber setting grooves on the substrate;

forming the positioning mark extending across the plurality of the optical fiber setting grooves in the substrate;

setting the optical fiber with a lens in each of the optical fiber setting grooves; and positioning each of a plurality of the optical fiber connecting surfaces based on the positioning mark.

The invention provides a method of manufacturing an optical component according to the above invention, characterized in that it includes the step of cutting each of the graded index optical fibers in a position at a predetermined distance from the optical fiber connecting surfaces of the respective one of the plurality of optical fibers with a lens based on the positioning mark after each of the optical fiber connecting surfaces of the plurality of the optical fibers with a lens is positioned.

The above-described object is achieved by a method of manufacturing an optical component, characterized in that it includes the steps of:

forming a first optical fiber setting groove for setting an optical fiber on a substrate;

forming a second optical fiber setting groove extending across the first optical fiber setting groove on the substrate;

forming a first positioning mark extending across the first and the second optical fiber setting grooves on the substrate at a predetermined distance from the intersection between the first and the second optical fiber setting grooves;

forming a second positioning mark extending across the first and second optical fiber setting grooves on the substrate at a predetermined distance from the intersection, the second positioning mark being disposed on the opposite side of the first positioning mark with respect to the intersection and in substantially parallel and face-to-face relationship with the first positioning mark;

setting first to third optical fibers with a lens provided by connecting a single-mode optical fiber and a graded index optical fiber on an optical fiber connecting surface in the optical fiber setting grooves, the first and the second optical fibers with a lens being set in the first optical fiber setting groove, the third optical fiber with a lens being set in the second optical fiber setting groove, an end face of the graded index optical fiber of each of the optical fibers being directed toward the intersection;

positioning the optical fiber connecting surface of the first optical fiber with a lens based on the first positioning mark;

positioning the optical fiber connecting surface of the second optical fiber with a lens based on the second positioning mark;

positioning the optical fiber connecting surface of the third optical fiber with a lens based on the first positioning mark;

forming an exposing groove which is provided in a position at a predetermined distance from the first positioning mark so as to include the intersection and in which an end face of the graded index optical fiber of each of the first to the third optical fibers with a lens is exposed in a position at a predetermined distance from the respective optical fiber connecting surface; and setting an optical element for multiplexing or demultiplexing light which has propagated in and exited the first to the third optical fibers with a lens in the exposing groove.

The invention provides a method of manufacturing an optical component according to the above invention, characterized in that at least any one of the first to the third optical fibers with a lens is cut simultaneously with the intersection such that the graded index optical fiber will have a predetermined length.

The invention provides a method of manufacturing an optical component according to the above invention, characterized in that the first and the second positioning marks are formed like a groove.

The invention provides a method of manufacturing an optical component according to the above invention, characterized in that the first and the second positioning marks are formed as two parallel straight lines sandwiching a boundary of the optical fiber connecting surface.

The invention provides a method of manufacturing an optical component according to the above invention, characterized in that each of the optical fiber connecting surfaces of the first and the third optical fibers with a lens is positioned in the gap between the two parallel straight lines of the first positioning mark and in that the optical fiber connecting surfaces of the second optical fiber with a lens is positioned in the gap between the two parallel straight lines of the second positioning mark.

The invention makes it possible to mount an optical fiber with a lens on a substrate with high accuracy and to manufacture high performance optical components with high stability.

BRIEF DESCRIPTION OF THE DRAWINGS

FIGS. 5A and 5B show a schematic configuration of an optical isolator 10 which is an embodiment of the optical component in the first mode for carrying out the invention;

FIGS. 6A and 6B show a schematic configuration of an optical multiplexer/demultiplexer 40 as an optical component in a second mode for carrying out the invention;

FIG. 19 is a table showing set values of the positions on a substrate 41 where first and second positioning marks 43, 45, and the like are to be formed in the optical component in the second mode for carrying out the invention;

DESCRIPTION OF THE PREFERRED EMBODIMENTS

First Mode for Carrying Out the Invention

Figure 1A:
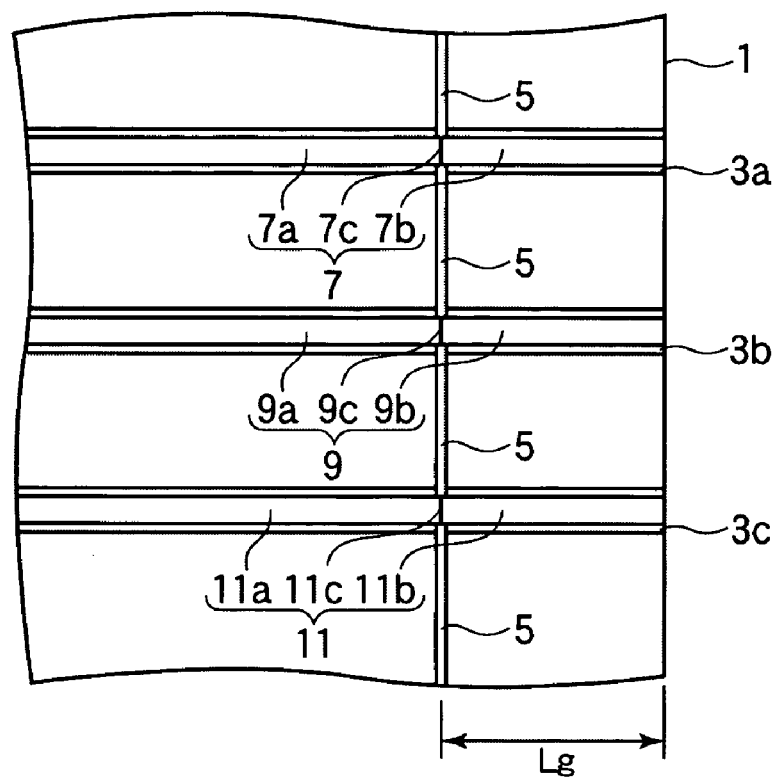
FIGS. 1A and 1B show a schematic configuration of an optical component in a first mode for carrying out the invention.
Figure 1B:
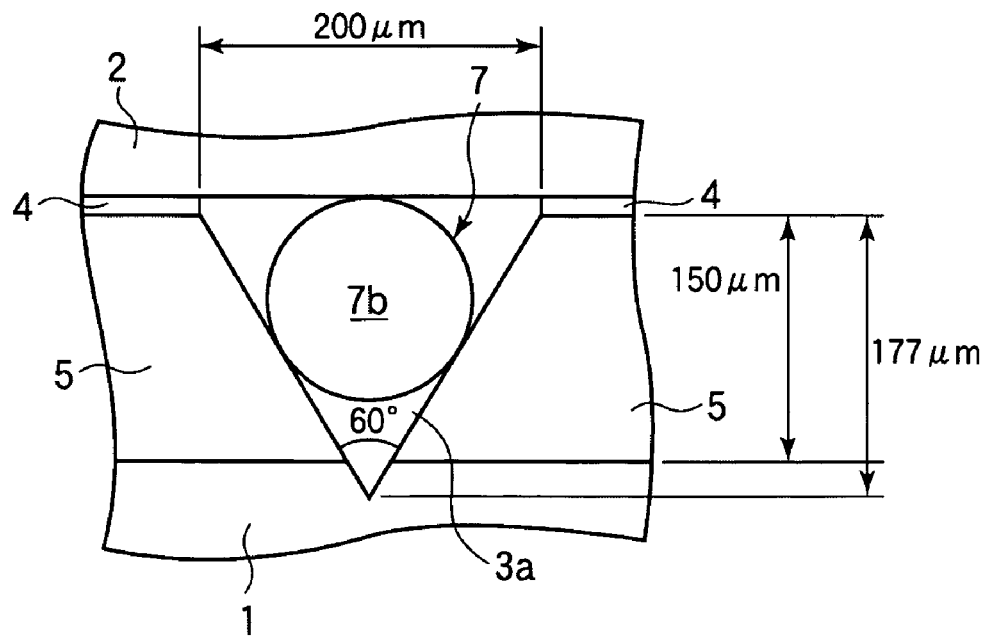

An optical component and a method of manufacturing the same in a first mode for carrying out the invention will now be described with reference to FIGS. 1A to 5B. First, a schematic configuration of the optical component in the present mode for carrying out the invention will be described with reference to FIGS. 1A to 2B. FIG. 1A is a partial plan view of the optical component in the present mode for carrying out the invention. FIG. 1B is a view of the neighborhood of a V-shaped groove 3a taken at an end of a substrate 1 in the direction of an optical axis of an optical fiber with a lens 7. FIG. 1B also shows a positioning mark 5.

As shown in FIG. 1A, the optical component includes the substrate 1 which is formed from, for example, a glass material and V-shaped grooves (optical fiber setting grooves) 3a, 3b, and 3c for setting optical fibers, the grooves extending on a plurality of straight lines (three lines in FIG. 1A) provided in parallel with each other. The optical fiber with a lens 7, which is constituted by an SMF 7a and a GIF 7b connected with each other, is set in the V-shaped groove 3a. For example, the GIF 7b is connected with the SMF 7a by fusion-bonding optical fiber connecting surfaces 7c. The GIF 7b is a graded index optical fiber whose refractive index is graded in the radial direction of the optical axis thereof. The GIF 7b has a function of transforming a divergent bundle of rays exiting from SMF 7a into a parallel bundle of rays or convergent pencil of rays and transforming a parallel bundle of rays entering the optical fiber with a lens 7 into a convergent pencil of rays.

As shown in FIG. 1B, the V-shaped groove 3a is formed in a V-like shape which has a groove width of about 200 μm on the surface of the substrate 1 and a groove depth of about 177 μm and which has an angle of about 600 at the apical part thereof. The optical fiber with a lens 7 is secured in the V-shaped groove 3a in tight contact therewith using an optical fiber securing plate 2 which is formed from, for example, a glass material. The optical fiber securing plate 2 is secured to the substrate 1 using, for example, an ultraviolet-setting resin 4. The V-shaped groove 3b is formed with a V-shaped section similarly to the V-shaped groove 3a. An optical fiber with a lens 9, which is provided similarly to the optical fiber with a lens 7 by connecting an SMF 9a and a GIF 9b at optical fiber connecting surfaces 9c, is set in the V-shaped groove 3b. The V-shaped groove 3c is also formed with a V-shaped section similarly to the V-shaped groove 3a. An optical fiber with a lens 11, which is provided similarly to the optical fiber with a lens 7 by connecting an SMF 11a and a GIF 11b at optical fiber connecting surfaces 11c, is set in the V-shaped groove 3c.

Figure 2A:
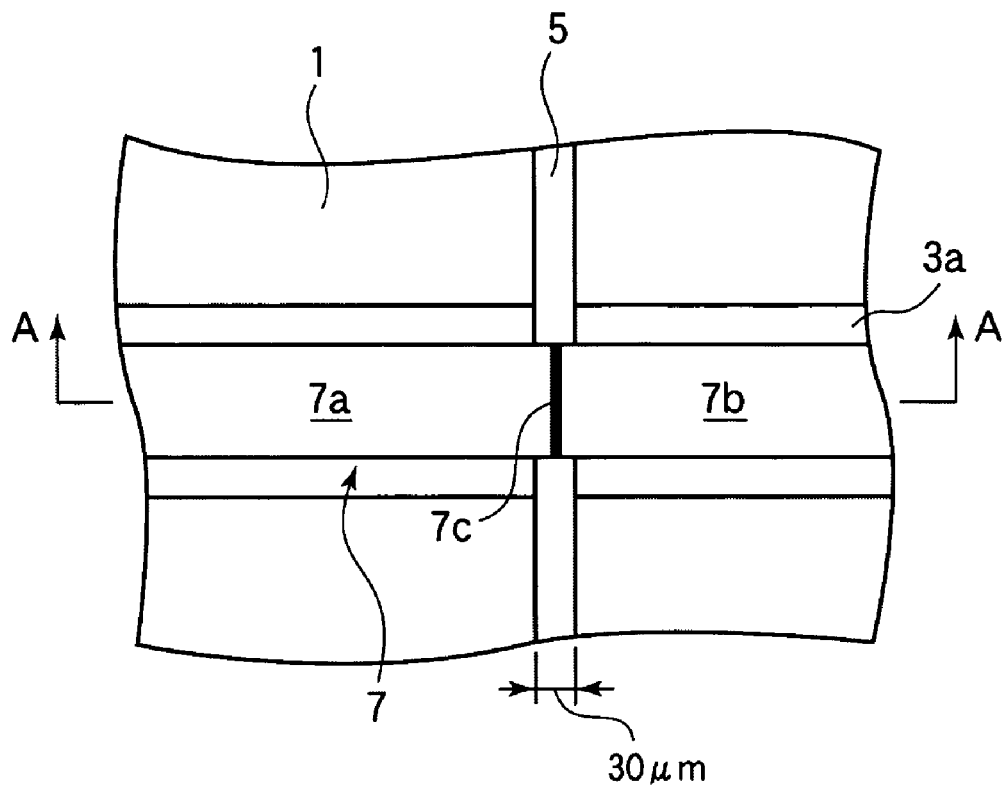
FIGS. 2A and 2B show the neighborhood of optical fiber connecting surfaces 7c of an optical fiber with a lens 7 as the optical component in the first mode for carrying out the invention.
Figure 2B:
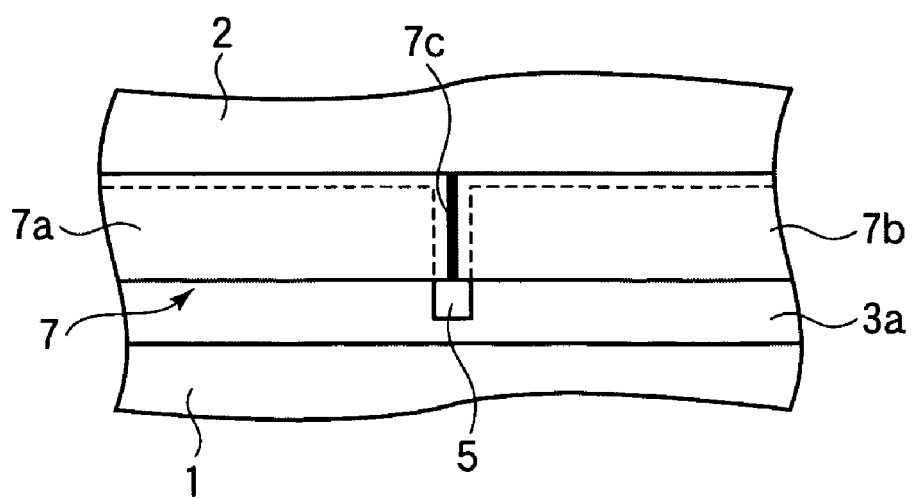

The optical component also has a positioning mark 5 used for positioning the optical fiber connecting surfaces 7c, 9c, and 11c, in the form of a straight line extending across the V-shaped grooves 3a, 3b, and 3c in an orthogonal relationship therewith. FIGS. 2A and 2B show the neighborhood of the optical fiber connecting surfaces 7c of the optical fiber with a lens 7. FIG. 2A is a partial plan view of the surface of the substrate 1 on which the V-shaped groove 3a is formed. FIG. 2B shows a section taken along the line A-A shown in FIG. 2A.

As shown in FIGS. 2A and 2B, the positioning mark 5 is formed with a groove-like configuration in that the positioning mark 5 has a concave shape in a section thereof orthogonal to the extending direction of the same. The positioning mark 5 is formed with a groove width of about 30 μm and a groove depth of about 150 μm (see FIG. 1A). Thus, the positioning mark 5 is formed with a groove depth slightly smaller than the depth of the apical part of the V-shaped groove 3a. Since the positioning mark 5 is formed like a groove having a concave shape, it is visually perceived as two parallel straight lines when viewed in a direction normal to the surface on which the V-shaped groove 3a is formed. The optical fiber connecting surface 7c is positioned while interposed in the gap between the two parallel lines.

As shown in FIG. 1A, the boundaries of the optical fiber connecting surfaces 9c and 11c are also positioned in the gap between the two parallel lines defined by the positioning mark 5. After the optical fiber connecting surfaces 7c, 9c, and 11c are positioned, the GIFs 7b, 9b, and 11b are cut in a position at a length Lg from the optical fiber connecting surfaces 7c, 9c, and 11c based on the positioning mark 5, and the GIFs 7b, 9b, and 11b are therefore formed with substantially the same length Lg.

In the optical component in the present mode for carrying out the invention, since optical fiber connecting surfaces 7c, 9c, and 11c can be positioned based on the positioning mark 5 as thus described, the optical fibers with a lens 7, 9, and 11 can be quite easily and highly accurately disposed on the substrate 1. The GIFs 7b, 9b, and 11b can be cut in the position at the length Lg from the optical fiber connecting surfaces 7c, 9c, and 11c based on the positioning mark 5. It is therefore possible to form a high performance optical component having optical fibers with a lens 7, 9, and 11 from which light beams exit at quite similar exiting angles.

A method of manufacturing an optical component in the present mode for carrying out the invention will now be described with reference to FIGS. 3A to 4B. FIGS. 3A to 4B show steps for manufacturing an optical component in the present mode for carrying out the invention.

Figure 3A:
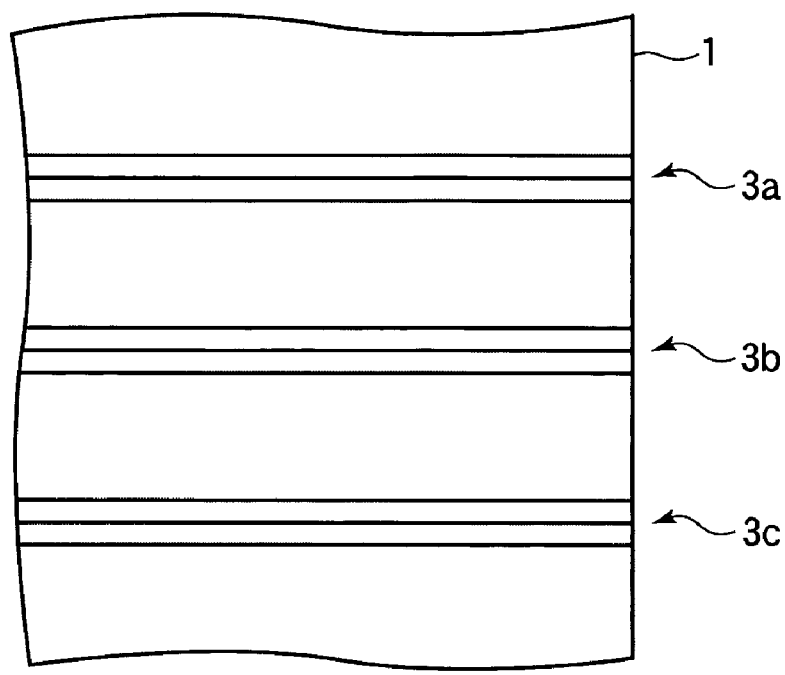
FIGS. 3A and 3B show steps for manufacturing the optical component in the first mode for carrying out the invention.
Figure 3B:
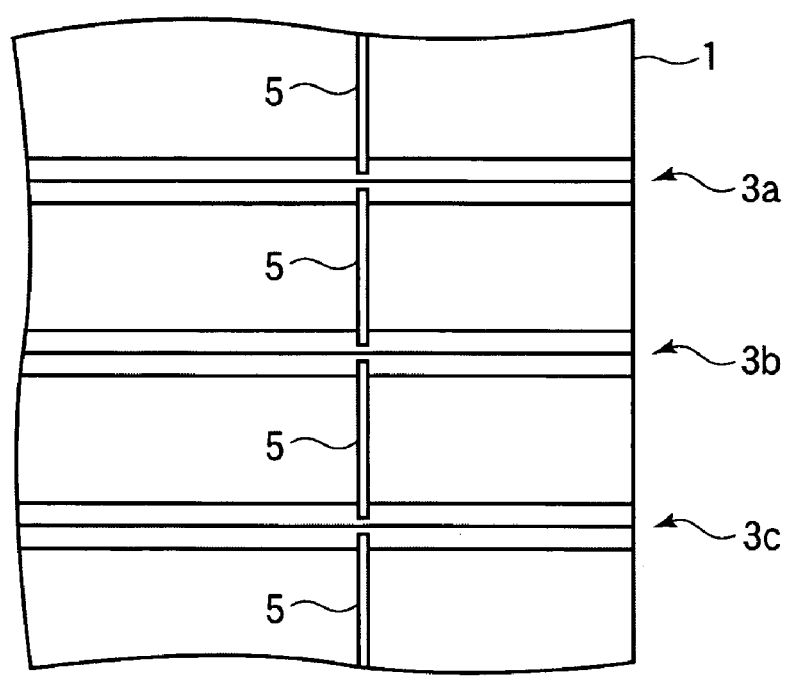

First, as shown in FIG. 3A, a plurality of V-shaped grooves (three grooves in FIG. 3A) 3a, 3b, and 3c for setting optical fibers are formed on a substrate 1, the grooves being disposed in parallel with each other and extending in the form of straight lines. Referring to the sectional shape of the V-shaped grooves 3a, 3b, and 3c, they are formed in a V-like shape having a groove width of about 200 μm on the surface of the substrate 1, a groove depth of about 177 μm, and an angle of about 60° at the apical part thereof. Next, as shown in FIG. 3B, a positioning mark 5 in the form of straight line extending across the V-shaped grooves 3a, 3b, and 3c in an orthogonal relationship therewith is formed in a position at a predetermined distance from an end of the substrate 1. Referring to the sectional shape of the positioning mark 5, it is formed in a concave shape having a groove width of about 30 μm and a groove depth of about 150 μm. Since the positioning mark 5 is formed like a concave groove, it is visually perceived as two parallel straight lines when viewed in a direction normal to the surface on which the V-shaped groove 3a is formed.

Figure 4A:
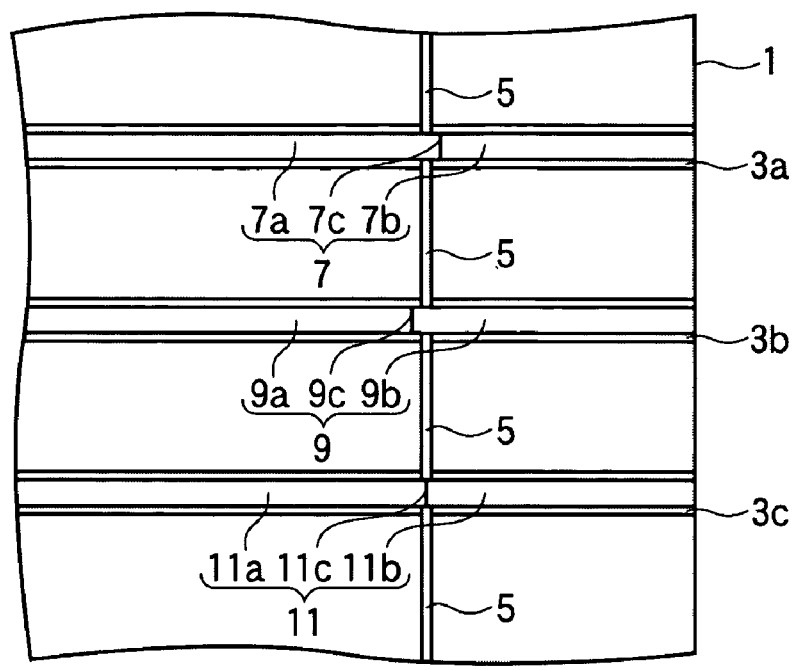
FIGS. 4A and 4B show steps for manufacturing the optical component in the first mode for carrying out the invention.

Next, as shown in FIG. 4A, optical fibers with a lens 7, 9, and 11 are set in the V-shaped grooves 3a, 3b, and 3c, respectively. GIFs 7b, 9b, and 11b are formed to extend a predetermined length Lg plus about 100 μm. Therefore, when the optical fibers with a lens 7, 9, and 11 are set with end faces of the GIFs 7b, 9b, and 11b aligned with each other, an optical fiber connecting surface 7c of the optical fiber with a lens 7 having the GIF 7b, which is shorter than a proper length, is shifted from the positioning mark 5 toward the end face of the substrate 1. An optical fiber connecting surface 9c of the optical fiber with a lens 9 having the GIF 9b, which is longer than the proper length, is shifted from the positioning mark 5 away from the end face of the substrate 1. An optical fiber connecting surface 11c of the optical fiber with a lens 11 having the GIF 11b, which has the proper length, is located in the gap between the two parallel straight lines defined by the positioning mark 5.

Figure 4B:
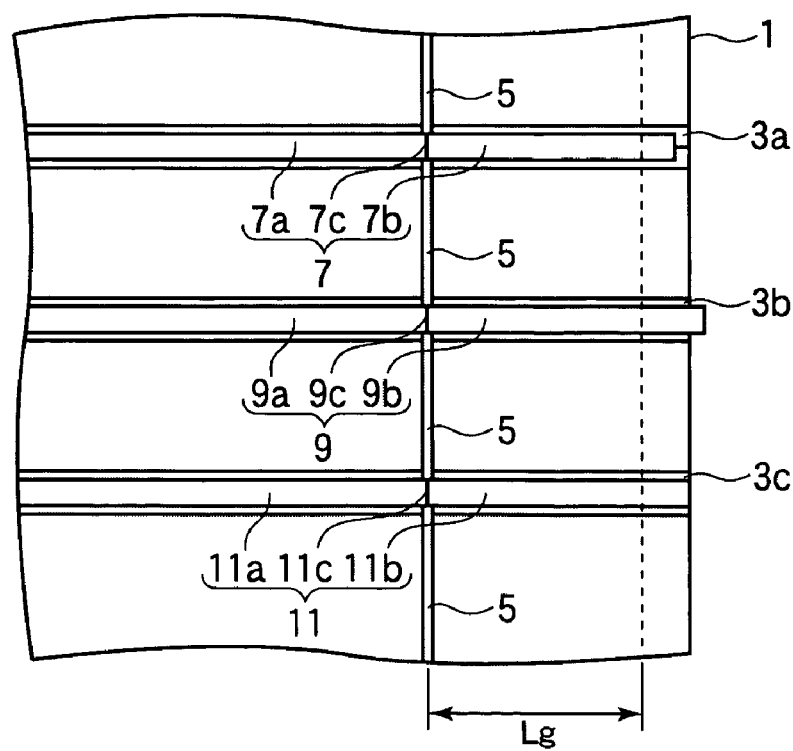

Next, as shown in FIG. 4B, the optical fiber with a lens 7 is shifted to the left in the figure such that the boundary of the optical fiber connecting surfaces 7c is positioned in the gap between the two parallel straight lines defined by the positioning mark 5. Next, the optical fiber with a lens 9 is shifted to the right in the figure such that the boundary of the optical fiber connecting surfaces 9c is positioned in the gap between the two parallel straight lines defined by the positioning mark 5. At this time, the positioning is performed such that the boundary of the optical fiber connecting surfaces 9c is substantially aligned with the same straight line on which the boundary of the optical fiber connecting surfaces 7c extends.

Next, an enlarged view of the intersection between the positioning mark 5 and the V-shaped groove 3c is presented. Since the boundary of the optical fiber connecting surfaces 11c is positioned in the gap between the two parallel straight lines defined by the positioning mark 5, the boundary of the optical fiber connecting surfaces 11c is positioned such that it is substantially aligned with the same straight line on which the boundaries of the optical fiber connecting surfaces 7c and 9c extend. As thus described, the optical fibers with a lens 7, 9 and 11 can be easily and accurately set in a certain positional relationship with each other based on the positioning mark 5. Enlarged views of the intersections between the positioning mark 5 and the V-shaped grooves 3a, 3b, and 3c may alternatively be presented by a microscope to position the optical fiber connecting surfaces 7c, 9c, and 11c.

When the optical fiber connecting surfaces 7c, 9c, and 11c are positioned based on the positioning mark 5, an ultraviolet-setting resin 4 (not shown in FIGS. 4A and 4B) is applied on the substrate 1, and an optical fiber securing plate 2 (not shown in FIGS. 4A and 4B) is placed on the substrate 1. Next, the resin 4 is set by irradiating it with ultraviolet light to secure the optical fibers with a lens 7, 9, and 11 on the V-shaped grooves 3a, 3b, and 3c.

Next, as shown in FIG. 4B, the GIFs 7b, 9b, and 11b are cut simultaneously with the substrate 1 in a position which is at a length Lg from the optical fiber connecting surfaces 7c, 9c, and 11c based on the positioning mark 5 using a dicing saw or peripheral slicer. As an alternative processing method, the GIFs may be processed by a horizontal grinder utilizing a cup-type grinding stone while positioning them on the machine or may be finished by polishing them after cutting. When polishing is performed to finish the GIFs, they are cut in the position at the length Lg plus something to leave some amount to be polished for finishing them. As shown in FIG.

1A, an optical component having optical fibers with a lens 7, 9, and 11 having GIFs 7b, 9b, and 11b which are quite similar in their length Lg.

As thus described, according to the method of manufacturing an optical component in the present mode for carrying out the invention, the positioning mark 5 extending across the V-shaped grooves 3a, 3b, and 3c are formed on the substrate 1, and each of the optical fiber connecting serfaces 7c, 9c and 11c can be positioned based on the positioning mark 5. Therefore, the optical fibers with a lens 7, 9, and 11 can be properly and accurately set on the substrate 1 in a certain positional relationship with each other. Since the positioning mark 5 can be formed in the same manner as described using a mechanical processing machine for forming the substrate 1 and the V-shaped grooves 3a, 3b, and 3c, the optical component in the present mode for carrying out the invention can be manufactured without providing an additional apparatus for forming the positioning mark 5. It is therefore possible to suppress investment on facilities. Further, since a plurality of the high performance optical fibers with a lens 7, 9, and 11 having uniform optical characteristics can be stably and simultaneously manufactured, an optical component can be provided at a low cost through an improvement of yield of manufacture.

Embodiment

An embodiment of an optical component in the present mode for carrying out the invention will now be described with reference to FIGS. 5A and 5B. FIGS. 5A and 5B show a schematic configuration of a polarization-independent optical isolator 10. FIG. 5A is a view of the optical isolator 10 taken in a direction normal to the plane of substrates 13 and 14. FIG. 5B shows a section taken along the line A-A in FIG. 5A.

As shown in FIGS. 5A and 5B, the optical isolator 10 includes an optical element 30 constituted by a first birefringent plate 33, a Faraday rotator 35, a half-wave plate 37, and a second birefringent plate 39. The first and the second birefringent plates 33 and 39 are disposed such that their optical axes are substantially in parallel with each other. Magnets 31 for applying a magnetic field to the Faraday rotator 35 are disposed so as to sandwich the optical element 30.

The substrate 13 is disposed on the side of the first birefringent plate 33. The substrate 13 is formed with eight V-shaped grooves 21 which are disposed in parallel with each other and which extent in the form of straight lines and a positioning mark 17 which is in the form of a straight line extending across the V-shaped grooves 21 in an orthogonal relationship with them. An optical fiber with a lens 19, which is positioned based on the positioning mark 17, is disposed in each of the V-shaped grooves 21. One end of a jacket 27 of the optical fibers with a lens 19 is removed to expose an SMF 19a and a GIF 19b. The GIF 19b is connected to the SMF 19a using, for example, fusion-boding. An end face of the GIF 19b is exposed at an end face of the substrate 13 opposite to the first birefringent plate 33. The eight GIFs 19b are formed with a predetermined length such that light beams exiting the optical fibers with a lens 19 are substantially parallel rays. The optical fibers with a lens 19 are secured in the V-shaped grooves 21 with an optical fiber securing plate 15. The optical fiber securing plate 15 is secured on the substrate 13.

The substrate 14 is disposed on the side of the second birefringent plate 39. The substrate 14 is formed with eight V-shaped grooves 25 which are disposed in parallel with each other and which extent in the form of straight lines and a positioning mark 18 which is in the form of a straight line extending across the V-shaped grooves 25 in an orthogonal relationship with them. An optical fiber with a lens 23, which is positioned based on the positioning mark 18, is disposed in each of the V-shaped grooves 25. One end of a jacket 29 of the optical fibers with a lens 23 is removed to expose an SMF 23a and a GIF 23b. The GIF 23b is connected to the SMF 23a using, for example, fusion-boding. An end face of the GIF 23b is exposed at an end face of the substrate 14 opposite to the second birefringent plate 39. The eight GIFs 23b are formed with a predetermined length such that light beams exiting the optical fibers with a lens 23 are substantially parallel rays. The optical fibers with a lens 23 are secured in the V-shaped grooves 25 with an optical fiber securing plate 16. The optical fiber securing plate 16 is secured on the substrate 14.

Because of birefringence at the first and the second birefringent plates 33 and 39, a light exit end of the second birefringent plate 39 is offset downward from a light exit end of the optical fibers with a lens 19 as shown in FIG. 2B. Therefore, a light entrance end of the optical fibers with a lens 23 is disposed at a predetermined offset from the light exit end of the optical fibers with a lens 19. The GIFs 19b are formed with an accurate length based on the positioning mark 17 such that light beams exiting the optical fibers with a lens 19 are parallel rays. As a result, the optical isolator 10 is able to couple light exiting the optical fibers with a lens 19 to the optical fibers with a lens 23 in a preferable manner.

Operations of the optical isolator 10 will now be described. As shown in FIG. 5B, among light beams which have exited the optical fibers with a lens 19, a linearly polarized light beam α1 orthogonal to the optical axis of the first birefringent plate 33 is transmitted by the first birefringent plate 33 as an ordinary ray. The plane of polarization of the light beam α1 is rotated at respectively an angle of +45° by the Faraday rotator 35 and the half-wave plate 37. Since the plane of polarization of the light beam α1 is in parallel with the optical axis of the second birefringent plate 39 after the beam exits the half-wave plate 37, the light beam α1 is transmitted by the second birefringent plate 39 as an extraordinary ray. Since the light entrance end of the optical fiber with a lens 23 is disposed at the predetermined offset from the light exit end of the optical fiber with a lens 19, the light beam α1 transmitted by the second birefringent plate 39 enters the optical fiber with a lens 23.

Among the light beams exiting the optical fibers with a lens 19, a linearly polarized light beam α2 in parallel with the optical axis of the first birefringent plate 33 is transmitted by the first birefringent plate 33 as an extraordinary ray. The plane of polarization of the light beam α2 is rotated at respectively an angle of +45° by the Faraday rotator 35 and the half-wave plate 37. Since the plane of polarization of the light beam α2 is orthogonal to the optical axis of the second birefringent plate 39 after the beam exits the half-wave plate 37, the light beam α2 is transmitted by the second birefringent plate 39 as an ordinary beam. Since the light entrance end of the optical fiber with a lens 23 is disposed at the predetermined offset from the light exit end of the optical fiber with a lens 19, the light beam α2 transmitted by the second birefringent plate 39 enters the optical fiber with a lens 23.

Among the light beams exiting the optical fibers with a lens 23, a linearly polarized light beam β1 orthogonal the optical axis of the second birefringent plate 39 is transmitted by the second birefringent plate 39 as an ordinary ray. The plane of polarization of the light beam β1 is rotated at an angle of −45° by the half-wave plate 37 and rotated at an angle of +45° by the Faraday rotator 35. Since the plane of polarization of the light beam β1 is orthogonal to the optical axis of the first birefringent plate 33 after the beam exits the Faraday rotator 35, the light beam β1 is transmitted by the first birefringent plate 33 as an ordinary ray. Therefore, substantially none of the light beam β1 enters the optical fiber with a lens 19.

Among the light beams exiting the optical fibers with a lens 23, a linearly polarized light beam β2 in parallel with the optical axis of the second birefringent plate 39 is transmitted by the second birefringent plate 39 as an extraordinary ray. The plane of polarization of the light beam β2 is rotated at an angle of −45° by the half-wave plate 37 and rotated at an angle of +45° by the Faraday rotator 35. Since the plane of polarization of the light beam β2 is in parallel with the optical axis of the first birefringent plate 33 after the beam exits the Faraday rotator 35, the light beam β2 is transmitted by the first birefringent plate 33 as an extraordinary ray. Therefore, substantially none of the light beam β2 enters the optical fiber with a lens 19.

As described above, the optical isolator 10 includes the optical fibers with a lens 19 and 23 which are positioned based on the positioning marks 17 and 18. The GIFs 19b and 23b of the optical fibers with a lens 19 and 23 are accurately formed with a desired length based on the positioning marks 17 and 18 such that parallel rays exit the respective GIFs. In the optical isolator 10, light beams which have exited the optical fibers with a lens 19 can therefore enter the optical fibers with a lens 23 in a preferable manner.

It is also possible to form a plurality of optical fibers with a lens on the same substrate simultaneously, the positional relationship between the optical fibers being properly and accurately adjusted based on positioning marks. Thus, a plurality of optical isolators 10 having substantially uniform optical characteristics can be formed to combine a plurality of optical elements 30 having a uniform thickness and such optical fibers with a lens.

The optical fibers with a lens 19 and 23 can be regarded as having substantially the same characteristics. Therefore, when a plurality of the optical fibers with a lens 19 and 23 is accurately disposed positioning grooves (the V-shaped grooves 21 and 25 in the present embodiment) which are formed with high precision as in the case of the optical isolator 10, optical axis aligning performed on the optical fibers with a lens 19 and 23 disposed on both ends will allow the optical axes of the remaining optical fibers with a lens 19 and 23 to be aligned. The optical axes of the optical fibers with a lens 19 and 23 can be aligned using the same method as used for aligning the optical axes of a common planar light guide (PLC) and an optical fiber array.

First, a light source is connected to either of the optical fibers with a lens 19 and 23 facing each other in each of a first port (which is uppermost in FIG. 5A) and an eighth port (which is in lowermost in FIG. 5A), and an optical power meter is connected to the other, and the optical axis of each port is adjusted to obtain a maximum quantity of light. The optimum position coordinate (X, Y) of each optical axis is read, and based on the optimum, coordinates imaginary straight lines connecting the optical axes in the first through eighth ports are derived for the respective optical fibers with a lens 19 and 23. Then, adjustment is performed such that the angles of the imaginary straight lines agree with the angles of imaginary straight lines connecting the optical axes of the respective optical fibers with a lens 19 and 23. This operation is repeated to allow the optical axis of each of the first and the eighth ports to be adjusted. As thus described, in the optical isolator 10, optical axis aligning is only required for the first and the eighth ports of the optical fibers with a lens 19 and 23, and no optical axis aligning is required for the other ports. It is therefore possible to reduce time required for an aligning operation.

Second Mode for Carrying Out the Invention

Figure 7:
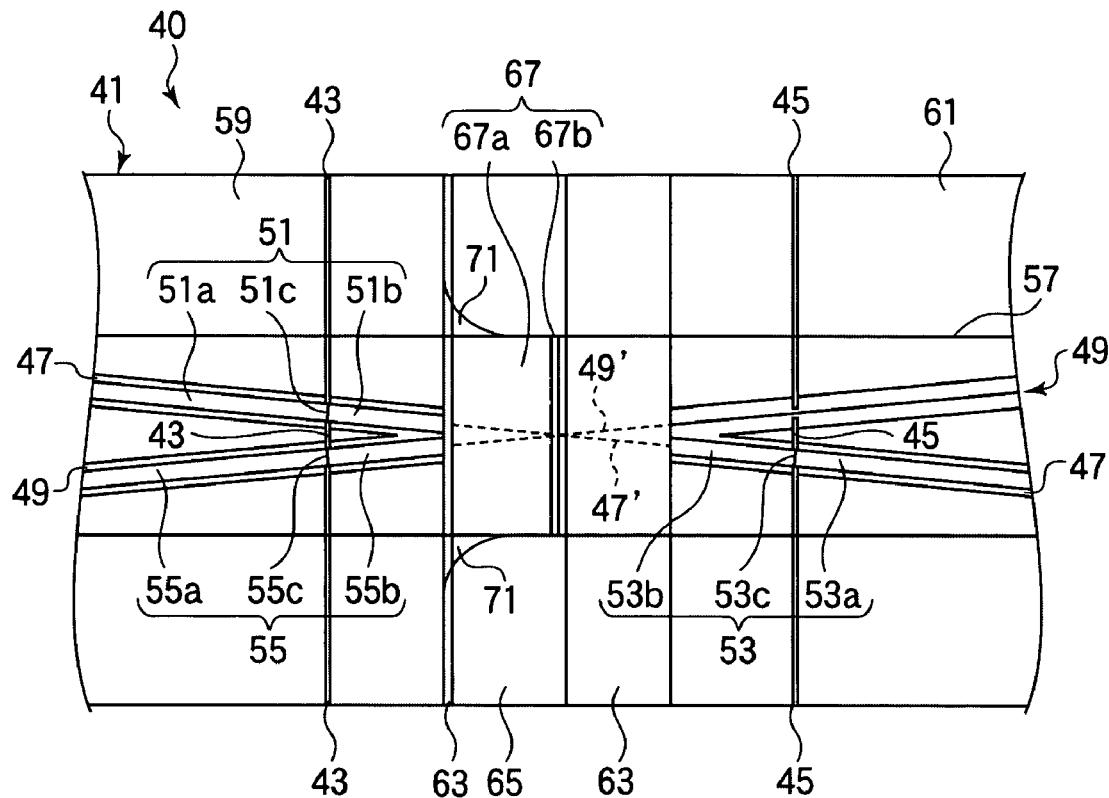
FIG. 7 shows the neighborhood of an exposing groove 63 at which end faces of GIFs 51b, 53b, and 55b of the optical multiplexer/demultiplexer 40 in the second mode for carrying out the invention are exposed.

An optical component and a method of manufacturing the same in a second mode for carrying out the invention will now be described with reference to FIGS. 6A to 24. First, a schematic configuration of an optical component in the present mode for carrying out the invention will be described with reference to FIGS. 6A to 7. FIGS. 6A and 6B show a schematic configuration of an optical multiplexer/demultiplexer 40 as an optical component in the present mode for carrying out the invention. FIG. 6A shows the schematic configuration of the optical multiplexer/demultiplexer 40 when viewed in a direction normal to the plane of a substrate 41. FIG. 6B shows the schematic configuration of the optical multiplexer/demultiplexer 40 when viewed in a direction normal to a plane which is orthogonal to the plane of the substrate 41 and which extends across an exposing groove 63. FIGS. 6A and 6B also show part of second and third optical fibers with a lens 53 and 55 which are disposed in first and second V-shaped grooves 47 and 49 and which are not visible in practice. FIG. 7 shows the neighborhood of the exposing groove 63 at which end faces of GIFs 51b, 53b, and 55b are exposed.

As shown in FIGS. 6A to 7, the optical multiplexer/demultiplexer 40 includes the substrate 41 which is formed from, for example, Tempax glass. A first V-shaped groove (a first optical fiber setting groove) 47 for setting an optical fiber, formed on a first imaginary straight line 47' in the plane of the substrate 41 and a second V-shaped groove (a second optical fiber setting groove) 49 formed on a second imaginary straight line 49' which intersects with the first imaginary straight line 47' in the plane of the substrate 41 are formed on the substrate 41. The first and the second V-shaped grooves 47 and 49 are formed with a V-like sectional shape similarly to the V-shaped grooves 3a, 3b, and 3c in the first mode for carrying out the invention.

Referring to FIG. 7, a first positioning mark 43 is formed on the substrate 41 at a predetermined distance from the intersection between the first and second imaginary straight lines 47' and 49', the first positioning mark being in the form of a straight line extending across the first and the second V-shaped grooves 47 and 49 at a predetermined angle. A second positioning mark 45 is formed on the substrate 41 at a predetermined distance from the intersection, the second positioning mark being disposed opposite to the first positioning mark 43 with respect to the intersection substantially in parallel with the first positioning mark and being in the form of a straight line extending across the first and the second V-shaped grooves 47 and 49 at a predetermined angle.

The first and the second positioning marks 43 and 45 are formed like a groove having a concave sectional shape similarly to the positioning mark 5 in the first mode for carrying out the invention. For example, the first and the second positioning marks 43 and 45 are formed with a depth that is slightly smaller than the depth of the apical parts of the first and the second V-shaped grooves 47 and 49. Since the first and the second positioning marks 43 and 45 are formed like concave grooves, they are visually perceived as two parallel straight lines when viewed in a direction normal to the surface on which the first V-shaped groove 47 is formed.

A first optical fiber with a lens 51 formed by connecting an SMF 51a and a GIF 51b is set in the first V-shaped groove 47. For example, the GIF 51b is connected to the SMF 51a at optical fiber connecting surfaces 51c using fusion-bonding. The first optical fiber with a lens 51 is positioned based on the first positioning mark 43 with an end face of the GIF 51b directed toward the intersection. The optical fiber connecting surfaces 51c are positioned such that they are located between the two parallel straight lines defined by the first positioning mark 43.

A second optical fiber with a lens 53 formed by connecting an SMF 53a and a GIF 53b is set in the first V-shaped groove 47. For example, the GIF 53b is connected to the SMF 53a at optical fiber connecting surfaces 53c using fusion-bonding. The second optical fiber with a lens 53 is positioned based on the second positioning mark 45 with an end face of the GIF 53b directed toward the intersection. The optical fiber connecting surfaces 53c are positioned such that they are located between the two parallel straight lines defined by the second positioning mark 45.

A third optical fiber with a lens 55 formed by connecting an SMF 55a and a GIF 55b is set in the second V-shaped groove 49. For example, the GIF 55b is connected to the SMF 55a at optical fiber connecting surfaces 55c using fusion-bonding. The third optical fiber with a lens 55 is positioned based on the first positioning mark 43 with an end face of the GIF 55b directed toward the intersection. The optical fiber connecting surfaces 55c are positioned such that they are located between the two parallel straight lines defined by the first positioning mark 43.

Steps are provided on both ends of the substrate 41 to allow jackets 52, 54, and 56 covering part of the first to the third optical fibers with a lens 51, 53, and 55 to be disposed there. The jackets 52, 54, and 56 are formed with an outer diameter greater than the outer diameter of the first to the third optical fibers with a lens 51, 53, and 55. The steps for disposing the jackets 52, 54, and 56 are provided on the ends of the substrate 41 to prevent the first to third optical fibers with a lens 51, 53, and 55 from being bent when disposed in the first and the second V-shaped grooves 47 and 49, respectively.

The first and the third optical fibers with a lens 51 and 55 are secured in the first and the second V-shaped grooves 47 and 49, respectively, in tight contact therewith by an optical fiber securing plate 59 which is secured on the substrate 41. The second optical fiber with a lens 53 is secured in the first V-shaped groove 47 in tight contact therewith by an optical fiber securing plate 61 which is secured on the substrate 41. The optical filter securing plates 59 and 61 are formed, for example, Tempax glass.

An exposing groove 63 is formed on the substrate 41. The exposing groove 63 is formed in a position at a predetermined distance from the first positioning mark 43 so as to include the intersection between the first and the second imaginary straight lines and in which end faces of the GIFs 51b, 53b, and 55b are exposed at predetermined positions from the optical fiber connecting surfaces 51c, 53c, and 55c. A setting groove 65 for setting an optical filter (optical element) 67 is formed in a position at a predetermined distance from the side of the exposing groove 63 on which the end faces of the GIFs 51b and 53b are exposed. The setting groove 65 is formed with a width that is slightly greater than the thickness of the optical filter 67. The setting groove 65 is formed so as to extend in the same direction as the exposing groove 63.

The optical filter 67 is disposed in the setting groove 65 to multiplex and/or demultiplex light which has exited the first to the third optical fibers with a lens 51, 53, and 55 after being propagated therein. The optical filter 67 has an optical element substrate 67a and a thin film 67b which is constituted by a dielectric multi-layer film. The optical element substrate 67a is formed from, for example, borosilicate glass (BK7). The optical element substrate 67a is disposed in a face-to-face relationship with the side of the exposing groove 63 on which the end faces of the GIFs 51b and 53b are exposed. The thin film 67b is formed on the surface of the optical element substrate 67a opposite to the surface facing the side of the groove.

The optical filter 67 is bonded to the side of the exposing groove 63 exposing the end faces of the GIFs 51b and 53b and the setting groove 65 with a resin 71 having a predetermined refractive index. Further, the optical filter 67 is secured above the exposing groove 63 with an optical filter securing plate 57 which is disposed across the exposing groove 63. The optical filter securing plate 57 is secured to the optical fiber securing plates 59 and 61 with, for example, an ultraviolet-setting resin (not shown). When the optical filter 67 is set in the setting groove 65, a part of the optical filter 67 protrudes above the optical fiber securing plates 59 and 61. Therefore, the optical filter securing plate 57 is formed with a concave groove-like feature to accommodate the protrusion of the optical filter 67 in the region where the optical filter 67 is set. The exposing groove 63 and the setting groove 65 are filled with an ultraviolet-setting resin (not shown) having a predetermined refractive index.

The optical multiplexer/demultiplexer 40 includes the first to the third optical fibers with a lens 51, 53, and 55 which are accurately positioned based on the first and the second positioning marks 43 and 45. Since the GIFs 51b, 53b, and 55b can be cut in a position at a predetermined distance from the optical fiber connecting surfaces 51c, 53c, and 55c based on the first and the second positioning marks 43 and 45, it is possible to form an optical multiplexer/demultiplexer 40 having first to the third optical fibers with a lens 51, 53, and 55 of high performance from which light beams exit at quite similar exiting angles.

Further, the exposing groove 63 and the setting groove 65 having a predetermined width can be formed in a position at predetermined distance based on the positioning mark 43. By optimizing the thickness and the refractive index of the optical filter 67, the refractive index of the resin 71, and the refractive index of the resin with which the exposing groove 63 and the setting groove 65 are filled, it is possible to form an optical multiplexer/demultiplexer 40 of high performance. For example, light having a predetermined wavelength which has exited the first optical fiber with a lens 51 is transmitted or reflected by the optical filter 67, and the transmitted light can be coupled to the second optical fiber with lens 53, and the reflected light can be coupled to the third optical fiber with a lens 55. Light having a predetermined wavelength which has exited the second optical fiber with a lens 53 is transmitted by the optical filter 67, and the light can be coupled to the first optical fiber with a lens 51.

Figure 8:
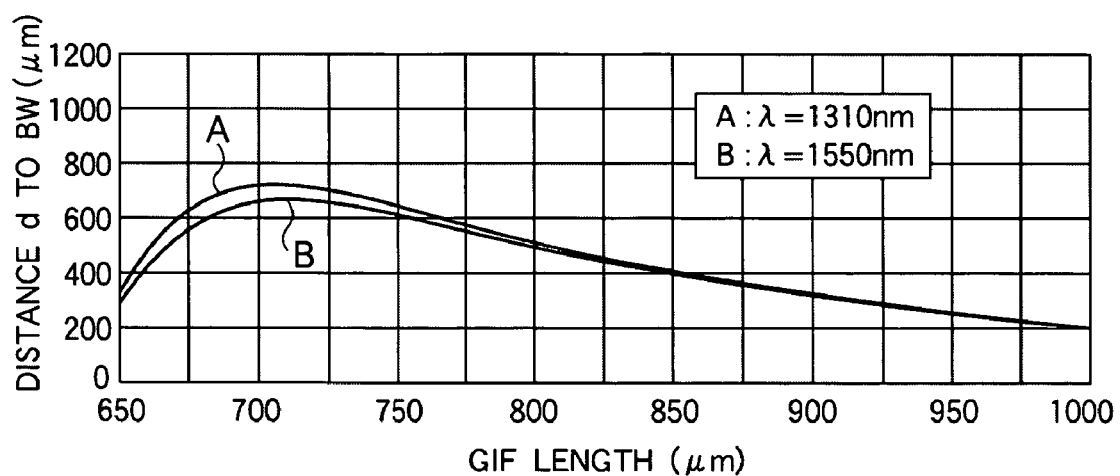
FIG. 8 is a graph showing a relationship between distances from an exit end face of a GIF to a beam waist (BW) and lengths of the GIF in the optical component in the second mode for carrying out the invention.
Figure 9:
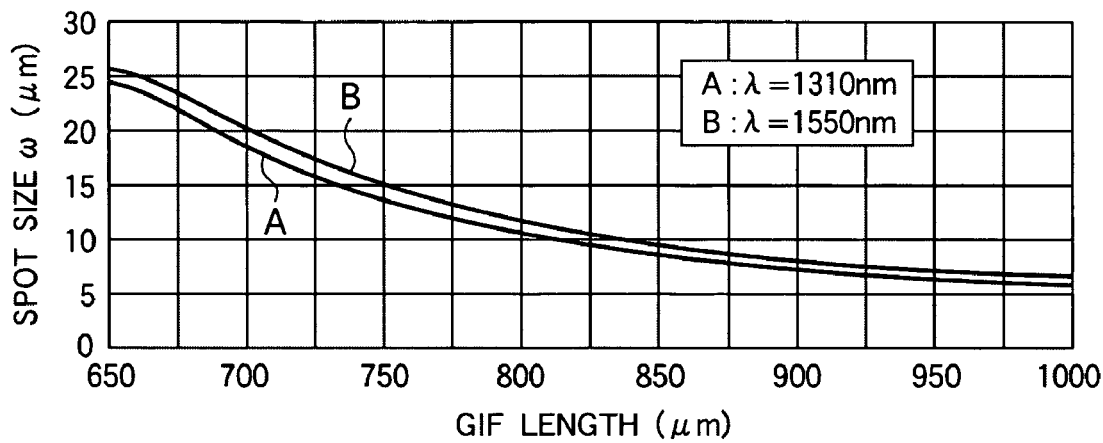
FIG. 9 is a graph showing a relationship between spot sizes ω of light which has exited the exit end face of the GIF and the lengths of the GIF in the optical component in the second mode for carrying out the invention.

A method of manufacturing the optical multiplexer/demultiplexer 40 in the present mode for carrying out the invention will now be described with reference to FIGS. 8 to 24. First, the design of the optical fibers with a lens 51, 53, and 55 will be described with reference to FIGS. 8 to 14. FIGS. 8 and 9 show a relationship between beam shape parameters of light and the length of a GIF, the parameters being set for light which has propagated in an SMF, entered the GIF having the effects of a lens, and passed through and exited the GIF. Referring to parameters of the GIF used, the GIF has a core diameter of 104.3 µm, a clad diameter of 125.7 µm, and a relative index difference $\Delta$ of 0.84%. The SMF connected with the GIF, and a wavelength $\lambda$ of light propagated in the SMF and GIF are respectively two kinds. One of the SMFs has a mode field diameter (MFD) of 9.2 µm, and the wavelength $\lambda$ of light propagated in the SMF is 1310 nm. The other SMF has a mode field diameter of 10.4 µm, and the wavelength $\lambda$ of light propagated in the SMF is 1550 nm.

FIG. 8 shows a relationship between distances from an exit end face of the GIF to a beam waist (BW) and lengths of the GIF. The abscissa axis of FIG. 8 represents lengths (μm) of the GIF, and the ordinate axis represents distances d (μm) from the exit end face of the GIF to the beam waist. In FIG. 8, the curve A represents a relationship between distances d from the exit end face of the GIF to the beam waist and lengths of the GIF in the case of light having the wavelength λ of 1310 nm, and the curve B represents a relationship between distances d from the exit end face of the GIF to the beam waist and lengths of the GIF in the case of light having the wavelength λ of 1550 nm. FIG. 9 shows a relationship between spot sizes ω of light which has exited the exit end face of the GIF and the lengths of the GIF. The abscissa axis of FIG. 9 represents lengths (μm) of the GIF, and the ordinate axis represents spot sizes ω (μm). In FIG. 9, the curve A represents a relationship between spot sizes ω and lengths of the GIF in the case of light having the wavelength λ of 1310 nm, and the curve B represents a relationship between spot sizes ω and lengths of the GIF in the case of light having the wavelength λ of 1550 nm. FIGS. 8 and 9 show characteristics of light exited from the GIF into the atmosphere (which has a refractive index n=1).

The GIF lengths from 650 μm to 1000 μm shown in FIG. 8 substantially correspond to lens meandering pitches from 0.25 to 0.4, and the distance d to the beam waist is largest at a length in the range from 700 to 720 μm which is slightly shifted from the pitch 0.25 (the GIF length of 650 μm). The distance d to the beam waist decreases as the GIF length becomes closer to the meandering pitch of 0.5 (the GIF length of 1300 μm).

As indicated by the curves A and B in FIG. 9, the spot size ω is largest at the meandering pitch of 0.25 (the GIF length of 650 μm) and smallest at the meandering pitch of 0.5 (the GIF length of 1300 μm) regardless of the wavelength λ. Within the range of GIF length from 650 to 1000 μm, light having the wavelength λ of 1550 nm is greater in spot size ω than light having the wavelength λ of 1310 nm.

In the case of an optical fiber with a lens used in an actual optical component, in order to allow an optical element inserted in the optical path to be disposed in a proper position, the optical fiber must have a sufficiently long working distance (the distance from a light exit end face of the optical fiber with a lens to the optical element). Since an allowable amount for an optical coupling loss attributable to a positional or angular offset of the light exit end face of the GIF depends on the spot size ω, such factors must be taken into consideration to obtain a proper and well-balanced light beam.

Figure 10:
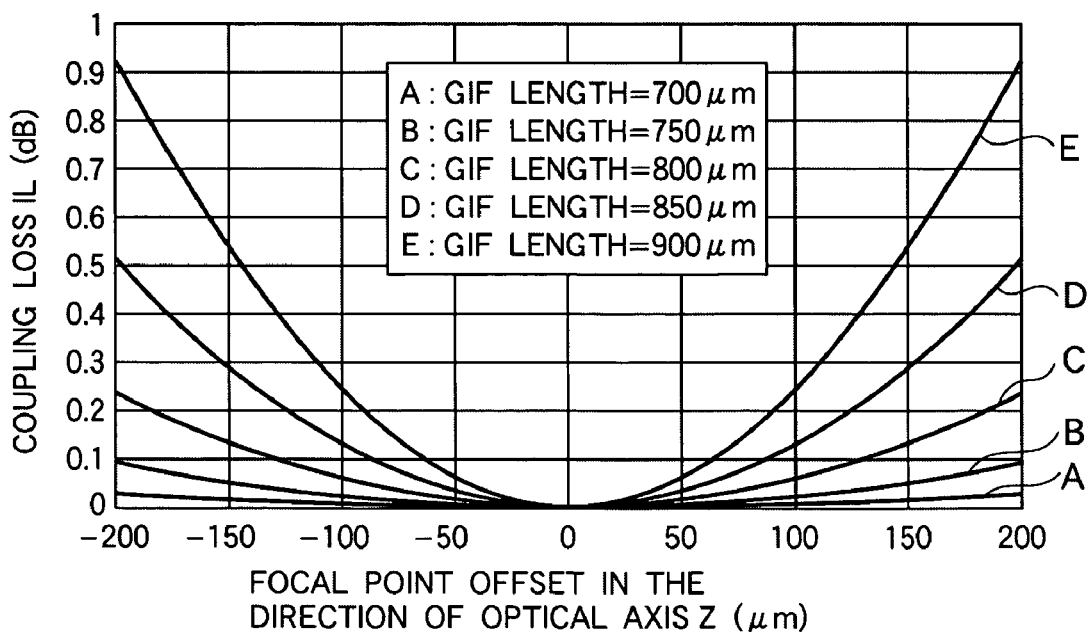
FIG. 10 is a graph showing a relationship between focal point offsets and coupling losses of incident light in the optical component in the second mode for carrying out the invention, the focal point offsets being measured in the direction of the optical axis at a light exit end face of a light-emitting optical fiber with a lens.
Figure 11:
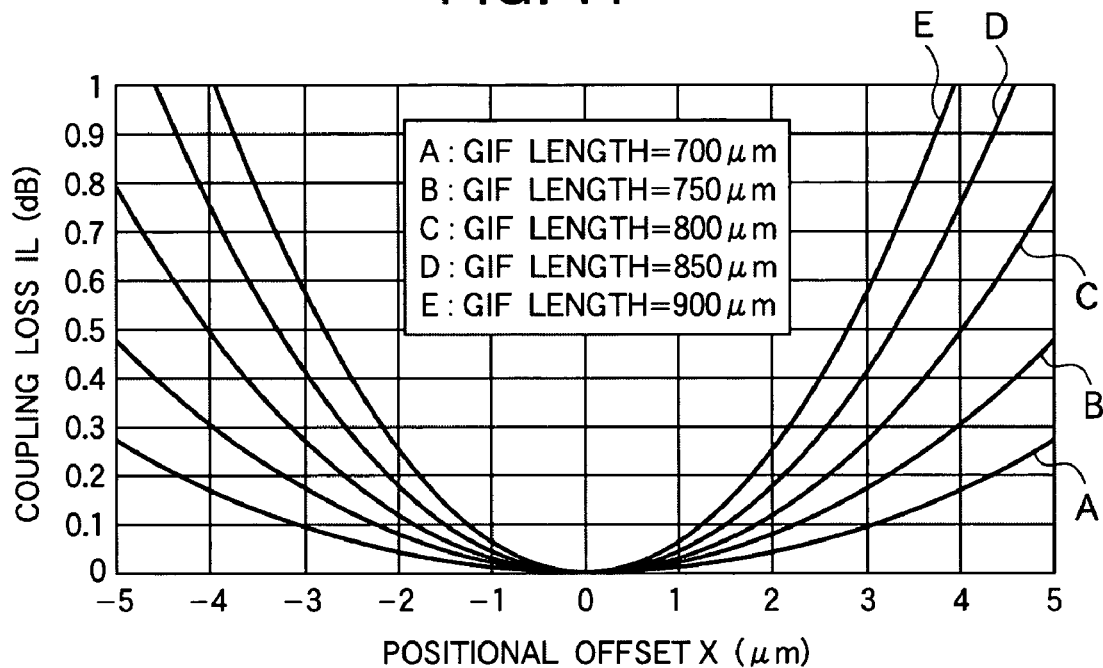
FIG. 11 is a graph showing a relationship between positional offsets of the light exit end face of the light-emitting optical fiber with a lens and coupling losses of incident light in the optical component in the second mode for carrying out the invention.
Figure 12:
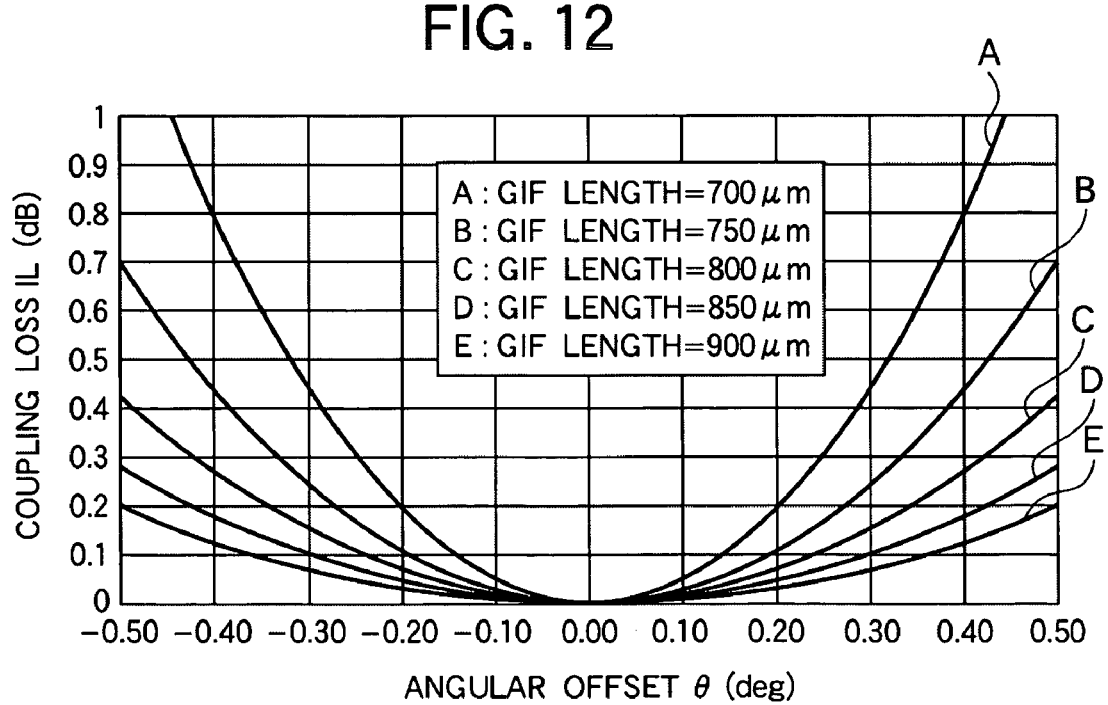
FIG. 12 is a graph showing a relationship between angular offsets of the light exit end face of the light-emitting optical fiber with a lens and coupling losses of incident light in the optical component in the second mode for carrying out the invention.

A description will now be made with reference to FIGS. 10 to 12 on an offset of a focal length and positional and angular offsets which can be tolerated for each GIF length. The characteristics shown in FIGS. 10 to 12 are calculated under the conditions described below such that the characteristics approximate to those of an actual optical system because the characteristics depend on the refractive index of the space into which light is emitted. There is a space having a refractive index n of 1.45 between a light exit end face of an optical fiber with a lens for emitting light and a light entrance end face of an optical fiber with a lens for receiving the light. The light has a wavelength of 1550 nm, and an SMF connected to a GIF has a mode field diameter of 10.4 μm.

FIG. 10 shows a relationship between focal point offsets and coupling losses of incident light, the focal point offsets being measured in the direction of the optical axis at the light exit end face of the light-emitting optical fiber with a lens relative to the light entrance end face of the light-receiving optical fiber with a lens. The abscissa axis of FIG. 10 represents focal point offsets Z (μm) in the direction of the optical axis, and the ordinate axis represents coupling losses IL (dB). In FIG. 10, the curves A, B, C, D, and E indicate a relationship between focal point offsets Z (μm) in the direction of the optical axis and coupling losses IL (dB) in the cases of a GIF length of 700 μm, a GIF length of 750 μm, a GIF length of 800 μm, a GIF length of 850 μm, and a GIF length of 900 μm, respectively. A focal point offsets Z (μm) in the direction of the optical axis is represented by the amount of an offset from a reference focal length of light which exits the light-emitting optical fiber with a lens.

As shown in FIG. 10, the greater a focal point offsets Z in the direction of the optical axis, the greater the resultant coupling loss IL. The greater the GIF length, the greater the resultant coupling loss IL is.

FIG. 11 shows a relationship between positional offsets of the light exit end face of the light-emitting optical fiber with a lens from the light entrance end face of the light-receiving optical fiber with a lens and coupling losses of the incident light, the length of the GIF serving as a parameter. The abscissa axis of FIG. 11 represents positional offsets X (μm), and the ordinate axis represents coupling losses IL (dB). In FIG. 11, the curves A, B, C, D, and E indicate a relationship between positional offsets X (μm) and coupling losses IL (dB) in the cases of a GIF length of 700 μm, a GIF length of 750 μm, a GIF length of 800 μm, a GIF length of 850 μm, and a GIF length of 900 μm, respectively.

As shown in FIG. 11, the greater a positional offset X, the greater the resultant coupling loss IL. The greater the GIF length, the greater the resultant coupling loss IL is.

FIG. 12 show a relationship between angular offsets of the light exit end face of the light-emitting optical fiber with a lens from the light entrance end face of the light-receiving optical fiber with a lens and coupling losses of incident light, the length of the GIF serving as a parameter. The abscissa axis of FIG. 12 represents angular offsets θ (°), and the ordinate axis represents coupling losses IL (dB). In FIG. 12, the curves A, B, C, D, and E indicate a relationship between angular offsets θ (°) and coupling losses IL (dB) in the cases of a GIF length of 700 μm, a GIF length of 750 μm, a GIF length of 800 μm, a GIF length of 850 μm, and a GIF length of 900 μm, respectively.

As shown in FIG. 12, the greater an angular offset θ, the greater the resultant coupling loss IL. The smaller the GIF length, the greater the resultant coupling loss IL is.

As shown in FIG. 10, allowance for the focal point offsets Z in the direction of the optical axis to keep the coupling loss IL at 0.3 dB or less is about ±120 μm for the GIF lengths from 700 to 900 μm (the curves A to E). On the contrary, as shown in FIG. 11, allowance for the positional offsets X to keep the coupling loss IL at 0.3 dB or less is about ±2.2 μm for the GIF length from 700 to 900 μm (the curves A to E). Thus, the positional offsets X have a greater influence on the coupling losses IL because the allowance for them is smaller than that for the focal point offsets Z.

As shown in FIG. 12, allowance for the angular offsets θ to keep the coupling loss IL at 0.3 dB or less is about ±0.25° for the GIF lengths from 700 to 900 μm (the curves A to E). The angular offsets θ have a greater influence on the coupling losses IL than the positional offsets X when attention is paid to the fact that it is difficult to measure an angular offset of ±0.25° or to adjust such an offset. Therefore, the angular offsets are most significant and followed by the positional offsets, and the focal point offsets in terms of their influence on the coupling loss IL. Under the circumstance, let us assume that the GIFs 51*b*, 53*b*, and 55*b* have a length of 800

μm in consideration to the positional offsets X and the angular offsets θ, in particular, the allowable loss for the angular offsets θ.

Incidentally, a GIF to serve a graded index lens has a meandering pitch Lp of about 2528 μm. The GIF length of 800 μm corresponds to a pitch of 0.32 (800 μM/2528 μm). The lens length (pitch length) of 800 μm (a pitch of 0.32) is longer than pitches in the range from about 0.25 to 0.28 employed by graded index lens collimators which are commonly used.

The pitch length in the present mode for carrying out the invention is set longer than common pitch lengths as a result of a consideration on which of a positional offset or angular offset results in a more significant change in the coupling loss of the optical system of the optical multiplexer/demultiplexer 40. As shown in FIGS. 8 and 9, the distance d to the beam waist, the spot size ω, and the focal length are greater, the closer the lens pitch to 0.25 (the GIF length of 700 μm). As a result, greater focal point offsets and positional offsets are tolerated as shown in FIGS. 10 and 11. However, as shown in FIG. 12, greater changes in the amount of loss are caused by angular offsets.

On the contrary, when the lens pitch is made closer to 0.5 (the GIF length of 900 μm), the distance d to the beam waist, the spot size ω, and the focal length become smaller as shown in FIGS. 8 and 9, and greater changes in the amount of loss are caused by focal point offsets and positional offsets as shown in FIGS. 10 and 11. However, greater angular offsets are tolerated as shown in FIG. 12. The pitch length of the GIF is tentatively set at 800 μm that is somewhat greater than pitch lengths according to the related art in consideration to such characteristics of coupling loss relative to positional offsets and angular offsets, the capacity of manufacturing steps, design, and an optical axis correcting function to be used.

Figure 13:
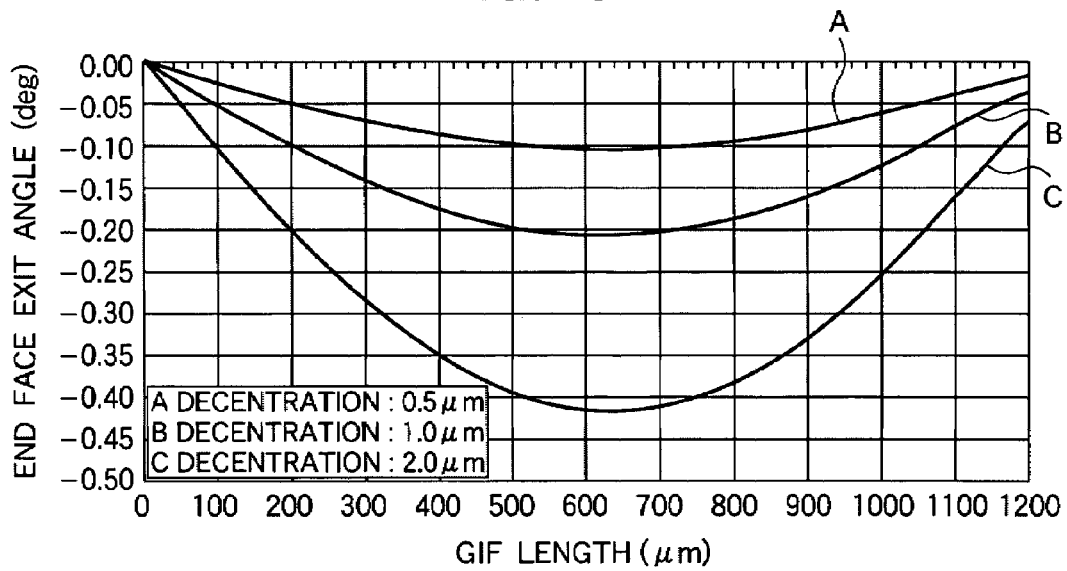
FIG. 13 is a graph showing a relationship between GIF lengths and end face exiting angles in the optical component in the second mode for carrying out the invention.
Figure 14:
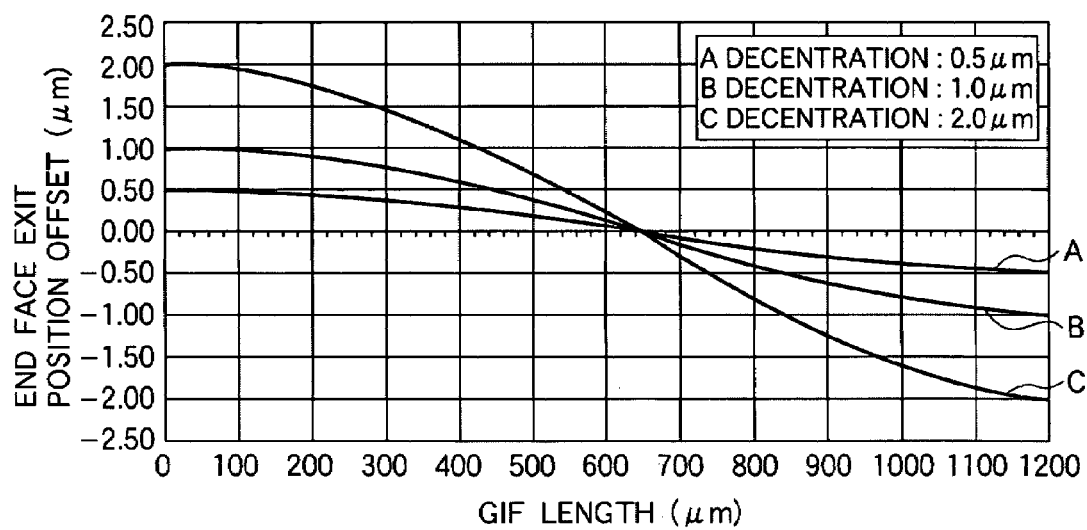
FIG. 14 is a graph showing a relationship between GIF lengths and offsets of the end face exiting position in the optical component in the second mode for carrying out the invention.

Further, since the optical fibers with a lens 51, 53, and 55 are formed by connecting the SMFs 51a, 53a, and 55a with the GIFs 51b, 53b, and 55b, respectively, using fusion-bonding, the optical axes of the SMFs 51a, 53a, and 55a may be decentration from the optical axes of the GIFs 51b, 53b, and 55b, respectively, by about 1 μm. Further, the center of the axis of the index profile of a GIF may be eccentric relative to the core and clad of the optical fiber. A decentration between the optical axes of an SMF and GIF can cause a positional offset or angular offset of light exiting an end face of the optical fiber with a lens. FIGS. 13 and 14 show angular offsets and positional offsets of light exiting an end face of an optical fiber with a lens attributable to a decentration between optical axes.

FIG. 13 shows a relationship between GIF lengths and end face exiting angles. The abscissa axis of FIG. 13 represents GIF lengths (μm), and the ordinate axis represents end face exiting angles (°) The curves A, B, and C in FIG. 13 indicate a relationship between GIF lengths and end face exiting angles in the case of an optical axis decentration of 0.5 μm, an optical axis decentration of 1.0 μm, and an optical axis decentration of 2.0 μm, respectively. As shown in FIG. 13, the end face exiting angle monotonously increases when the GIF length is in the range from 0 to 600 μm, reaches a maximum when the GIF length is about 600 to 650 μm, and monotonously decreases when the GIF length is in the range from 650 to 1200 μm. The greater an optical axis decentration, the greater the resultant end face exiting angle is.

FIG. 14 shows a relationship between GIF lengths and offsets of the end face exiting position. The abscissa axis of FIG. 14 represents GIF lengths (μm), and the ordinate axis represents offsets (μm) of the end face exiting position. The curves A, B, and C in FIG. 14 indicate a relationship between GIF lengths and offsets (μm) of the end face exiting position in the case of an optical axis decentration of 0.5 μm, an optical axis decentration of 1.0 μm, and an optical axis decentration of 2.0 μm, respectively. As shown in FIG. 14, the absolute values of offsets of end face exiting position are 0 when the GIF length is about 640 μm and are greater than 0 in any case when the GIF length is smaller or greater than 640 μm.

It is necessary to select such a GIF length that no significant coupling loss IL occurs even when there is an optical axis decentration on the order of 1 μm. As described above, angular offsets of the GIF exit end face have the most significant influence on coupling losses IL. Therefore, end face exiting angles must have priority over offsets of the end face exiting position when studied as a parameter related to optical axis decentration. As shown in FIG. 13, when there is an optical axis decentration of 1.0 μm in a GIF having a GIF length of 800 μm, the end face exiting angle becomes about −0.2°. Since a change in the end face exiting angle attributable to an optical axis decentration must be considered both in an optical fiber on the light emitting side and an optical fiber on the light receiving side, it can be assumed that an optical axis decentration of 1.0 μm in a GIF having a GIF length of 800 μm results in an angular offset of about −0.4°. As shown in FIG. 12, an angular offset θ of 0.4° results in a coupling loss IL of 0.3 dB which is relatively small.

On the contrary, as shown in FIG. 14, an optical axis decentration of 1.0 μm in a GIF having a GIF length of 800 μm results in an offset of −0.4 μm of the end face exiting position. When this is taken into consideration for both of the light emitting and receiving optical fibers, it can be assumed that a positional offset of −0.8 μm will occur under the condition. Further, since an offset of the GIF end face exiting angle is caused by the optical axis decentration as described above, attention must be paid also to an offset attributable to the distance that the light at the offset exiting angle travels to be coupled to the light entrance surface of the opposite optical fiber with a lens. An optical axis decentration of 1.0 μm in the GIF of 800 μm results in an angular offset of 0.4°. Therefore, when the change in the end face exiting angle is taken into consideration, there is a positional offset of −0.8 μm+the distance between the light exit end face and the light entrance end face×tan 0.4°=−0.8 μm provided that there is no focal point offset Z in the direction of the optical axis and no optical axis decentration in the optical path. The positional offset is equal to the value in which such an angular offset is not reflected. As shown in FIG. 11, when the positional offset X is 0.8 μm, the coupling loss IL can be as very small as 0.05 dB.

From the above-described result of the study, the length of the GIFs 51b, 53b, and 55b was set at 800 μm which results in no significant coupling loss even when there is a decentration of about 1 μm between optical axes of the SMFs 51a, 53a, and 55a and the optical axes of the GIFs 51b, 53b, and 55b, respectively.

Figure 15A:
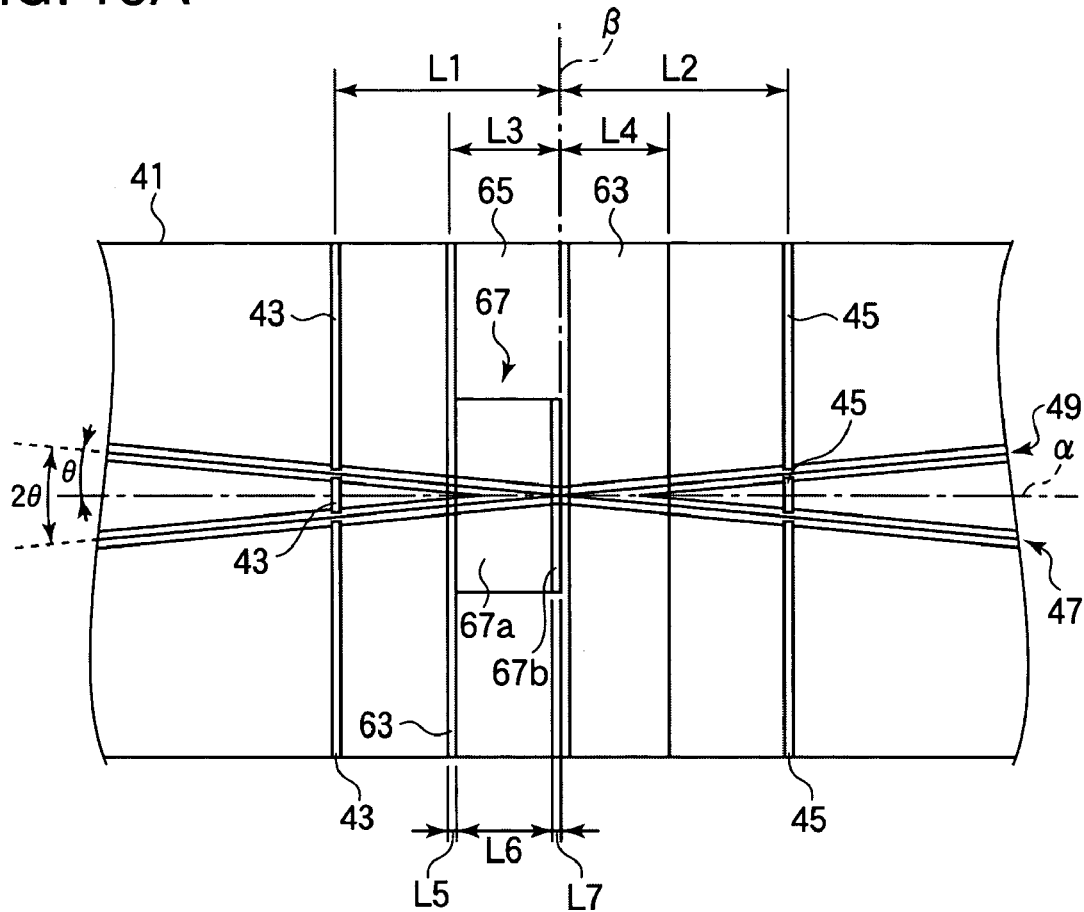
FIGS. 15A and 15B show parameters of such as the first and the second positioning marks 43 and 45 set in the optical component in the second mode for carrying out the invention.
Figure 15B:
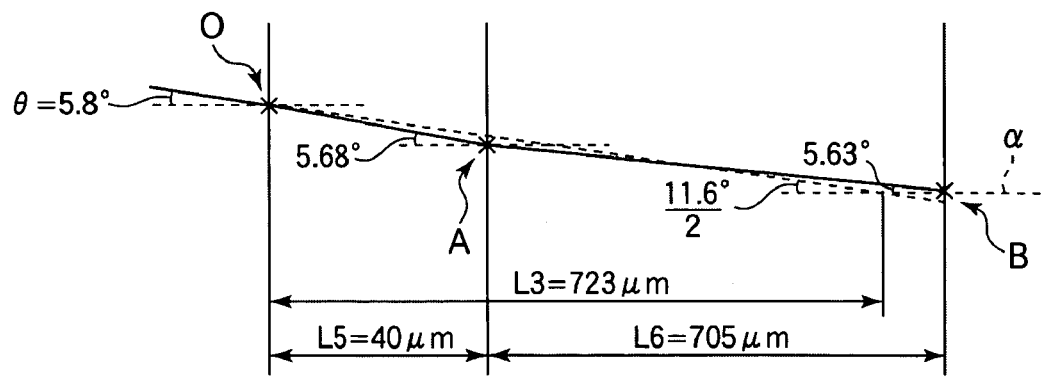

Next, a description will be made on a method of setting the first and the second positioning marks 43 and 45, the first and the second V-shaped grooves 47 and 49, and the exposing groove 63 formed on the substrate 41. FIGS. 15A and 15B show parameters set for the first and the second positioning marks 43, 45, and the like. FIG. 15A is a plan view of the substrate 41 in the neighborhood of the exposing groove 63. FIG. 15A also shows the optical filter 67 which is placed on the substrate 41. FIG. 15B schematically shows an optical path of light incident on the exposing groove 63. Lengths L5 and L6 in FIG. 15B are shown in a scale different from that in FIG. 15A for easier understanding.

The optical multiplexer/demultiplexer 40 employs the optical filter 67 which has wavelength characteristics such that light having a wavelength in the range from 1310 to 1500 nm is transmitted and such that light having a wavelength of 1550 nm is reflected. Light having a wavelength of 1490 nm or 1550 nm exits from the first optical fiber with a lens 51 shown in FIG. 7. Light having a wavelength of 1490 nm is incident on the optical filter 67 and transmitted by the same to be incident on and coupled to the second optical fiber with a lens 53. Light having a wavelength of 1550 nm is reflected by the optical filter 67 to be incident on and coupled to the third optical fiber with a lens 55. Light having a wavelength of 1310 nm exits the second optical fiber with a lens 53, and the light is transmitted by the optical filter 67 to be incident on and coupled to the first optical fiber with a lens 51. The relative positional relationship between the first and the second positioning marks 43 and 45, the first and the second V-shaped grooves 47 and 49, and the exposing groove 63 is designed to cause the optical multiplexer/demultiplexer 40 in such a manner.

As shown in FIG. 15A, θ represents an angle defined by a center line α represented by a chain line extending in the horizontal direction in the figure and the apical part of the first V-shaped groove 47. The relative angle between the first and the second V-shaped grooves 47 and 49 is represented by 2θ. The angle θ defined by the first groove 47 and the center line α is set at 5.8°. The relative angle 2θ between the first and the second V-shaped grooves 47 and 49 is set at 11.6° about the center line a serving as an axis of symmetry. Since the axis of symmetry of the first and the second V-shaped grooves 47 and 49 is the center line α, the angle defined by the apical part of the second V-shaped groove 49 and the center line α is 5.8°.

The first positioning mark 43 is orthogonal to the center line α, located on the left side of a center line β indicated by a chain line extending in the vertical direction in the figure at a distance of L1 from the same, and disposed substantially in parallel with the center line β. The second positioning mark 45 is located on the right side of the center line β in the figure at a distance L2 from the same and is disposed substantially in parallel with the center line β.

The side (the left side) of the exposing groove 63 toward the first positioning mark 43 is spaced from the center line β a distance of L3 and is disposed substantially in parallel with the center line β. The side (the right side) of the exposing groove 63 toward the second positioning mark 45 is spaced from the center line β a distance of L4 and is disposed substantially in parallel with the center line β. The length of the gap between the left side of the exposing groove 63 and the light entrance surface of the optical filter 67 is referred to as a distance L5. The thickness of the optical element substrate 67a of the optical filter 67 is referred to as an element substrate thickness L6, and the thickness of the thin film 67b is referred to as a film thickness L7. An intersection between the center line α and the center line β is located in the same position as an intersection between the apical parts of the first and the second V-shaped grooves 49 and 47 and also located in the same position as an intersection between the first and the second imaginary straight lines 47' and 49' in FIG. 7.

Next, a description will be made on a method of calculating the distance L1 to the first positioning mark 43 and the distance L3 to the left side of the exposing groove 63. First, a reflecting path (a path through which light exiting the first optical fiber with a lens 51 is reflected by the optical filter 67 and coupled to the third optical fiber with a lens 55) is set. Light reflected by the optical filter 67 has a wavelength λr of 1550 nm. When it is assumed that the light having a wavelength λr of 1550 nm is transmitted by the optical element substrate 67a formed from BK7, the optical element substrate 67a has a refractive index $n_{1550}$ of 1.501.

Figure 16:
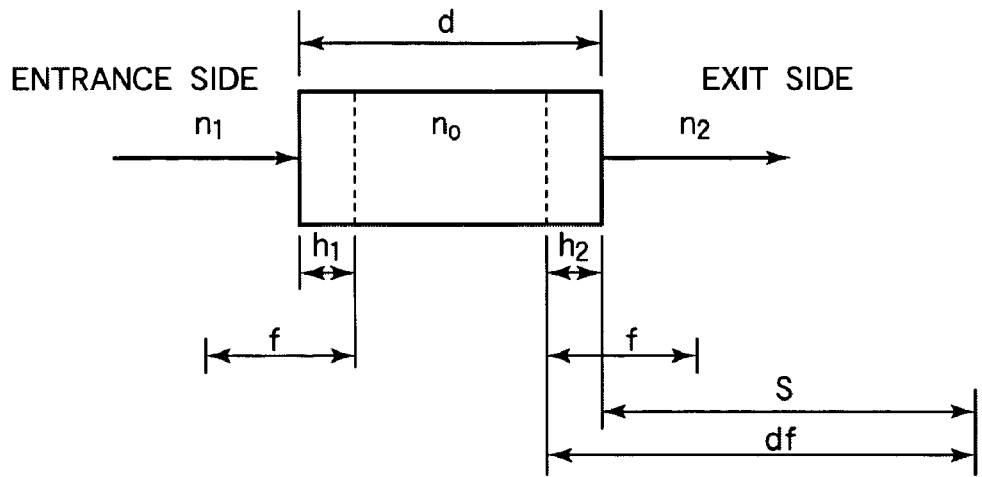
FIG. 16 shows a method of calculating a distance S to a beam waist from a light exit end face of a GIF 51b in the optical component in the second mode for carrying out the invention.

A description will now be made with reference to FIG. 16 on a method of calculating the distance (represented by S) from the light exit end face of the GIF 51b having a GIF length of 800 μm to the beam waist of light which has exited the end face. In order to calculate the distance S from the light exit end face of the GIF 51b to the beam waist, characteristic parameters of the lens are first obtained, and an image of light input to the lens and an output image as a result of conversion at the lens are obtained. The output image constitutes the size and distance of the beam waist.

Components A, B, C, and D of a beam matrix (M) of a graded index lens shown in FIG. 16 can be expressed as follows using a length d of the graded index lens, an axial refractive index $n_0$ of the lens, an entrance side refractive index $n_1$, an exit side refractive index $n_2$, and a focusing parameter $A_0$. The component A is the component in the first row and column of the beam matrix (M). The component B is the component in the first row and the second column of the beam matrix. The component C is the component in the second row and the first column of the beam matrix. The component D is the component in the second row and the second column of the beam matrix.

$$A = \cos(\sqrt{A_0}d) \qquad \text{Expression 1-1}$$

$$B = \frac{n_1}{n_0\sqrt{A_0}}\sin(\sqrt{A_0}d) \qquad \text{Expression 1-2}$$

$$C = -\frac{n_0\sqrt{A_0}}{n_2}\sin(\sqrt{A_0}d) \qquad \text{Expression 1-3}$$

$$D = \frac{n_1}{n_2}\cos(\sqrt{A_0}d) \qquad \text{Expression 1-4}$$

Assuming that the graded index lens is a GRIN lens, a focal length f of the graded index lens, a distance $h_1$ from an input side end face to a principal surface of the lens, and a distance $h_2$ from an output side end face to the principal surface of the lens can be expressed as follows.

$$f = -\frac{1}{C} \qquad \text{Expression 2}$$

$$h_1 = \frac{D-1}{C} \qquad \text{Expression 3}$$

$$h_2 = \frac{A-1}{C} \qquad \text{Expression 4}$$

Referring to the lens system of the optical fiber with a lens, since an SMF is disposed on an end face of the GRIN lens, incident light is located on the entrance side end face of the GRIN lens, the light having a spot size with a mode field diameter ω1 of the SMF. The light on the entrance side is in a position at the distance $h_1$ from the input side end face of the GRIN lens to the principal surface thereof. When light having a wavelength $λ_1$ passes through the lens, a distance df between the a principle surface on the exit side and the beam waist can be expressed as follows.

$$df = \frac{\left(\frac{\pi\omega_1^2}{\lambda_1}\right)^2 \frac{1}{f} - h_1\left(1 - \frac{h_1}{f}\right)}{\left(\frac{\pi\omega_1^2}{\lambda_1}\right)^2 \left(\frac{1}{f}\right)^2 + \left(1 - \frac{h_1}{f}\right)} \quad \text{Expression 5}$$

The distance S from the output end face of the optical fiber of the lens to the beam waist can be obtained by:

$$S = df - h_2 \quad \text{Expression 6}$$

Let us now assume that the length d of the graded index lens is 800 μm; the refractive index $n_0$ on the lens axis is 1.456; and the lens has an entrance side refractive index $n_1$ of 1.44416 and an exit side refractive index $n_2$ of 1.501 which are refractive indices that quartz glass exhibits against light having a wavelength λ of 1550 nm. Let as also assume that the graded index lens has a relative index difference Δ of 0.84% and a core semidiameter a of 52.15 μm. Then, a focusing parameter $\sqrt{A_0}$ is calculated as $\sqrt{(2\Delta)}/a = \sqrt{(2 \times 0.0084)}/52.15 = 2.485 \times 10^{-3}$. Further, it is assumed that the mode field diameter $\omega_1$ of the SMF is 10.4 μm and the light wavelength $\lambda_1$ is 1550 nm, and those values are substituted in Expressions 1 to 6. Then, the distance S to the beam waist is 748.3 μm when the refractive index $n_{1550}$ of 1.501. A method of calculating the axial refractive index $n_0 = 1.456$ of the lens will be described later.

The position of the beam waist must agree with the surface of the thin film 67b of the optical filter 67, and a light beam which has exited the first optical fiber with a lens 51 and a light beam which is incident on and coupled to the third optical fiber with a lens 55 must be disposed at angles and positions which are symmetrical about a line normal to the surface of the thin film 67b.

The description will be continued using specific values. Light which has exited the end face of the first optical fiber with a lens 51 passes through the resin 71 (see FIG. 7) having a refractive index $n_{1550}$ of 1.488 that fills the gap between the left side of the exposing groove 63 and the optical filter 67. Then, the light enters and passes through the optical element substrate 67a having a refractive index $n_{1550}$ of 1.501 and reaches the thin film 67b which has the property of reflecting and transmitting light.

The thickness of the resin 71 (adhesive) is equal to the length L5 of the gap between the left side of the exposing groove 63 and the optical filter 67, and the length L5 is 40 μm. The element substrate thickness L6 of the optical element substrate 67a is 705 μm. The angle of each light beam passing through the resin 71 and the optical element substrate 67a is as follows. The GIFs 51b, 53b, and 55b are quartz type optical fibers which are made to work as graded index lenses by adding a predetermined amount of refractivity adjusting material to the same. The axis refractive index no of the GIFs can be expressed by $n_0 = nf/(1-\Delta)$ using the relative index difference Δ and the refractive index nf of quartz. Let us now assume that the relative index difference Δ of the GIFs 51b, 53b, and 55b is 0.84% and that quartz exhibits a refractive index $nf_{1550}$ of 1.44416 against the wavelength λ of 1550 nm. Then, the GIFs 51b, 53b, and 55b have an axial refractive index $n_0$ of 1.456.

Since the optical axis of the first optical fiber with a lens 51 is inclined at 5.8° relative to a line normal to the left side of the exposing groove 63, light passes through the resin 71 at an inclination of $\sin^{-1}((1.456/1.488) \times \sin 5.8°) = 5.68°$ because of refraction. Also, the light passes through the optical element substrate 67a at an inclination of $\sin^{-1}((1.488/1.501) \times \sin 5.68°) = 5.63°$ relative to the line normal.

Therefore, the optical path length in the resin 71 is 40 μm/cos 5.68° = 40.2 μm, and the optical path length in the optical element substrate 67a is 705 μm/cos 5.63° = 708.4 μm. The distance to the beam waist is calculated as 748.3 μm (=(40.2 μm×1.488/1.501)+708.4 μm) when the GIF length is 800 μm from the optical path lengths and the refractive indices of the resin 71 and the optical element substrate 67a, and the distance agrees with the distance S to the beam waist calculated using Expressions 1 to 6.

The third optical fiber with a lens 55 must be located at such a position and distance that it is symmetrical to the end face of the first optical fiber with a lens 51 about the vertical axis of the light entrance surface of the thin film 67b which is a reflecting surface. As shown in FIG. 15B, a position A that is reached after passing the resin 71 is a position which is spaced by 40 μm from a position O on the end face of the first optical fiber with a lens 51 in a direction normal to the left side of the exposing groove 63 and which is spaced by 40 μm×tan 5.68°=3.98 μm from the position O in a direction in parallel with the extending direction of the exposing groove 63. A position B that is reached after passing through the optical element substrate 67a is a position which is spaced by 40 μm+705 μm=745 μm from the position O on the end face of the first optical fiber with a lens 51 in a direction normal to the exposing groove 63 and which is spaced by 3.98 μm+705 μm×tan 5.63°=73.48 μm from the position O in the direction in parallel with the extending direction of the exposing groove 63.

The distance L3 from the intersection between the first and the second V-shaped grooves 47 and 49 to the left side of the exposing groove 63 which constitutes end faces of the first and the third optical fibers with a lens 51 and 55 is 73.48 μm/tan(11.6°/2)=723 μm because the relative angle 2θ between the first and the second V-shaped grooves 47 and 49 is set at 11.6°.

The first and the third optical fibers with a lens 51 and 55 disposed in the first and the second V-shaped grooves 47 and 49 are inclined at an angle of 5.8° to the line normal to the left side of the exposing groove 63. Since the length of the GIF 51b and 55b of the first and the third optical fibers with a lens is set at 800 μm, the optical fiber connecting surfaces 51c and 55c at which the SMFs 51a and 55a are connected with the GIFs 51b and 55b, respectively, are in a position spaced by 800 μm×cos 5.8°=796 μm from the left side of the exposing groove 63. Therefore, the distance L1 of the first positioning mark 43 used for positioning the optical fiber connecting surfaces 51c and 55c is 723 μm+796 μm=1519 μm.

A description will now be made with reference to FIGS. 17 and 18 on a method of calculating the distance L2 of the second positioning mark 45 and the distance L4 of the right side of the exposing groove 63. The second posititing mark 45 is calculated from an optical system serving as the optical path that allows light which has exited the first optical fiber with a lens 51 to be transmitted by the optical filter 67 and to enter the second optical fiber with a lens 53 and another optical system serving as the optical path in the reverse direction that allows light exited the second optical fiber with a lens 53 to be transmitted by the optical filter 67 and to enter the first optical fiber with a lens 51. In the optical multiplexer/demultiplexer 40, light which passes through the first and the second optical fibers with a lens 51 and 53 has two kinds of wavelengths, i.e., 1310 nm and 1490 nm.

In the optical path for light transmitted by the optical filter 67, the same requirement for the optical path for reflected light applies in that the focal length of the first optical fiber with a lens 51 must be found to dispose the second optical fiber with a lens 53 in a proper position. However, there are wavelength characteristics (dispersion) of the optical fibers (SMF 51a and 53a), the lens parts (GIF 51b and 53b), the optical filter 67 set in the setting groove 65, the refractive index adjusting resin filling the gap between the exposing groove 63 and the setting groove 65, and the resin 71 which constitute the optical system of the optical multiplexer/demultiplexer 40. Since different wavelengths result in different refractive indices, there is some variation of the optimum focal length or refraction angle depending on wavelengths.

It is therefore necessary to calculate an optical path for each wavelength of transmitted light. FIGS. 17 and 18 show a relationship between widths L3+L4 of the exposing groove 63 and coupling losses IL. Parameters of the calculations in FIGS. 17 and 18 are as follows. The SMF propagating light having the wavelength $\lambda$ of 1310 nm has a mode field diameter of 9.2 $\mu$m. The SMF propagating light having the wavelength $\lambda$ of 1490 nm has a mode filed diameter of 10.0 $\mu$m. The GIFs have a core diameter of 104.3 $\mu$m, a clad diameter of 125.7 $\mu$m, and a relative refractivity difference $\Delta$ of 0.84%. The GIFs have an axial refractive index $n_{o13}$ of 1.4594 when the wavelength $\lambda$ is 1310 nm and an axial refractive index $n_{o14}$ of 1.4564 when the wavelength $\lambda$ is 1490 nm.

The resin 71, which is an acryl type, has a refractive index of 1.490 when the wavelength $\lambda$ is 1310 nm and a refractive index of 1.488 when the wavelength $\lambda$ is 1490 nm. The thickness (the distance L5) of the resin 71 is 40 $\mu$m which is the same as the design value of the reflecting system. BK7 from which the optical element substrate 67a is formed has a refractive index 1.5038 when the wavelength $\lambda$ is 1310 nm and a refractive index of 1.5017 when the wavelength $\lambda$ is 1490 nm. The thickness L6 of the optical element substrate 67a is 705 $\mu$m which is the same as the design value of the reflecting system. The thin film 67b constituted by a dielectric multi-layer film has an effective refractive index $n_e$ of 1.6. Since the thin film 67b is a dielectric multi-layer film formed by stacking a multiplicity of dielectric films having different refractive indices, the refractive index of the thin film 67b is represented by the effective refractive index $n_e$ which indicates the refractivity of the entire multi-layer film. The thickness L7 is 17 $\mu$m. The wavelength dispersion of the thin film 67b is not considered.

The material of the refractive index adjusting resin filling the gap between the thin film 67b and the right side of the exposing groove 63 and the distance from the thin film 67b to the right side of the exposing groove 63 are determined so as to offset the angle of refraction at the resin 71 and the optical filter 67. That is, a configuration is employed in which the axial refractive index of the first and the second optical fibers with a lens 51 and 53 substantially equals an effective refractive index of the entire optical path. A silicon resin is used as the refractive index adjusting resin which has a refractive index of 1.410 when the wavelength $\lambda$ is 1310 nm and a refractive index of 1.408 when the wavelength $\lambda$ is 1490 nm.

Figure 17:
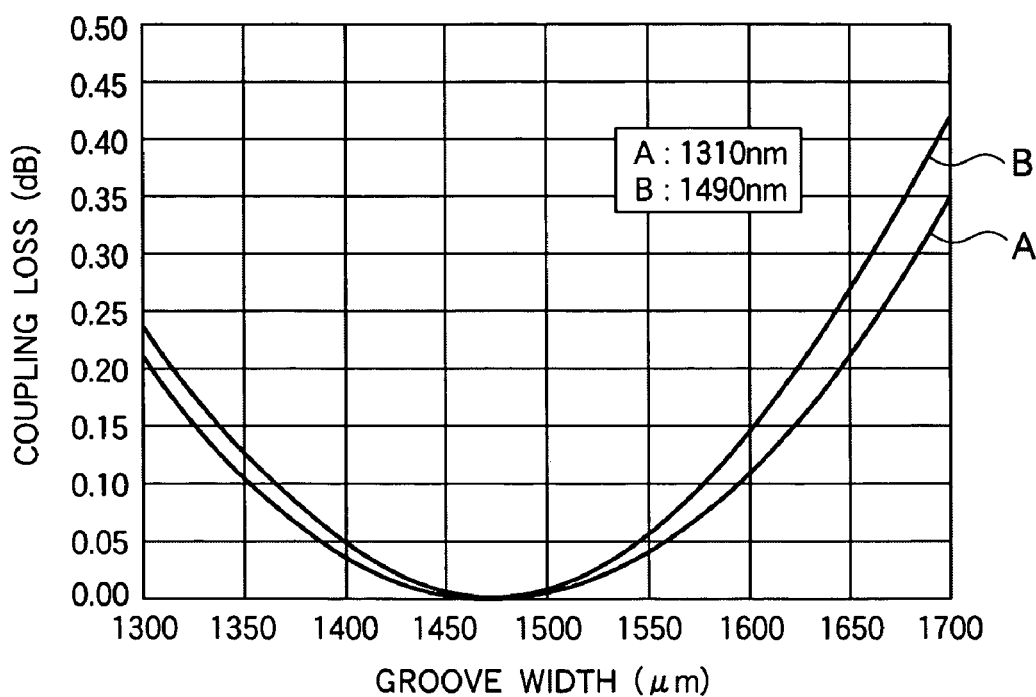
FIG. 17 is a graph showing a relationship between groove widths of the exposing groove 63 and coupling losses in the optical component in the second mode for carrying out the invention.

FIG. 17 shows a relationship between groove widths of the exposing groove 63 and coupling losses. The abscissa axis of FIG. 17 represents groove widths ($\mu$m), and the ordinate axis represents coupling losses (dB). In FIG. 17, the curve A indicates a relationship between groove widths ($\mu$m) of the exposing groove 63 and coupling losses (dB) when the wavelength $\lambda$ is 1310 nm, and the curve B indicates a relationship between groove widths ($\mu$m) of the exposing groove 63 and coupling losses (dB) when the wavelength $\lambda$ is 1490 nm. As shown in FIG. 17, the optimum groove width of the exposing groove 63 is 1480 $\mu$m at which no coupling loss occurs for both light wavelengths $\lambda$ of 1310 nm and 1490 nm.

However, since allowance for a positional offset or angular offset varies depending on the wavelength $\lambda$ of light, the groove width of the exposing groove 63 may be adjusted to a wavelength $\lambda$ which is sensitive to an offset of optical axes. FIG. 18 shows optical coupling characteristics relative to groove widths of the exposing groove 63 when there is an angular offset of 0.4°. The abscissa axis of FIG. 18 represents groove widths ($\mu$m), and the ordinate axis represents coupling losses (dB). In FIG. 18, the curve A indicates a relationship between groove widths ($\mu$m) of the exposing groove 63 and coupling losses (dB) when the wavelength $\lambda$ is 1310 nm, and the curve B indicates a relationship between groove widths ($\mu$m) of the exposing groove 63 and coupling losses (dB) when the wavelength $\lambda$ is 1490 nm.

Figure 18:
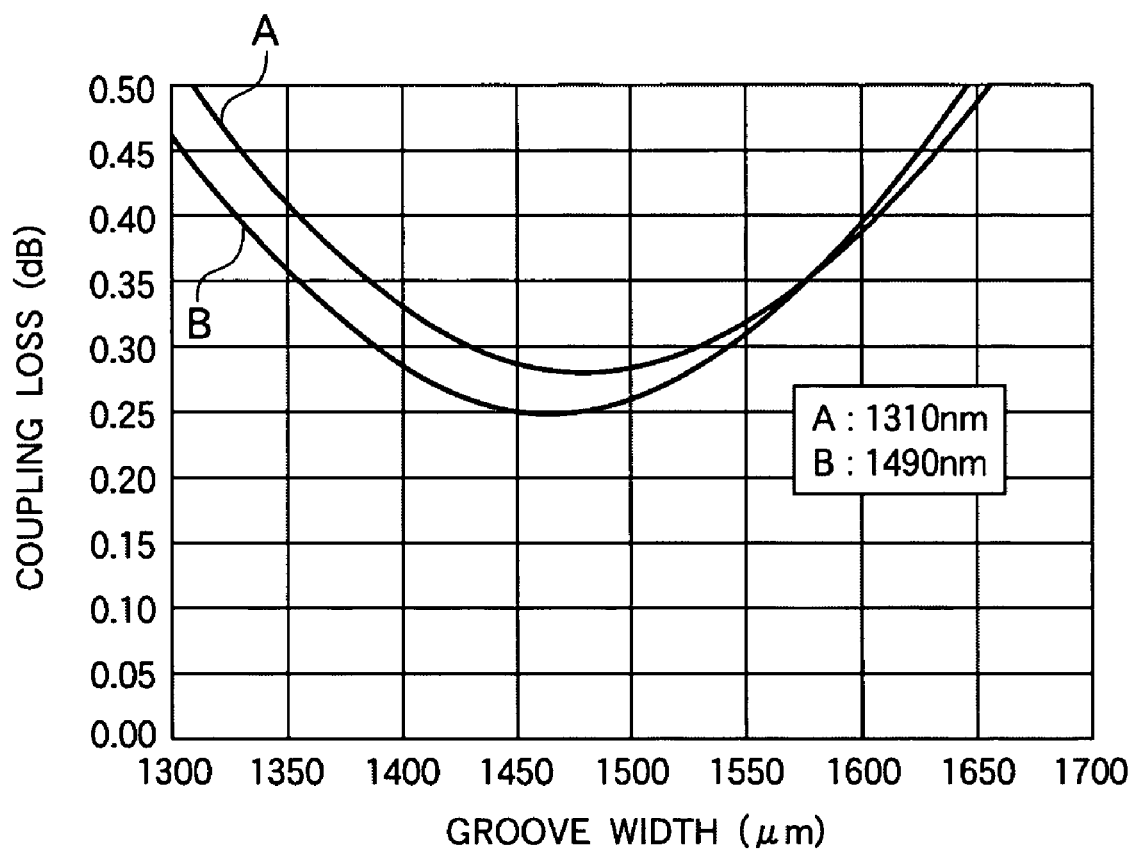
FIG. 18 is a graph showing optical coupling characteristics relative to groove widths of the exposing groove 63 when there is an angular offset of 0.4° in the optical component in the second mode for carrying out the invention.

As shown in FIG. 18, the coupling loss is smallest when the groove width is in the range from 1450 to 1500 nm for both wavelengths $\lambda$ of 1310 nm and 1490 nm. The coupling loss decreases in a greater amount with respect to an angular offset on the side of the shorter wavelength (the wavelength $\lambda$ of 1310 nm). In the optical multiplexer/demultiplexer 40 in the present mode for carrying out the invention, the layout of light beams on the substrate 41 is determined in consideration to coupling losses relative to angular offsets, and the groove width of the exposing groove 63 is set at 1470 $\mu$m. FIG. 19 shows a summary of set values of the thickness of the optical filter 67, the positions on the substrate 41 where the first and the second positioning marks 43 and 45 are to be formed, and soon calculated as described above on an assumption that the GIF length is 800 $\mu$m.

As shown in FIG. 19, the distance L1 of the first positioning mark 43 is 1519 $\mu$m; the distance L2 of the second positioning mark 45 is 1543 $\mu$m; and the distance L1+L2 between the first and the second positioning marks 43 and 45 is 3062 $\mu$m. The distance L3 of the left side of the exposing groove 63 is 723 $\mu$m. The distance L4 of the right side of the exposing groove 63 is 747 $\mu$m. The groove width L3+L4 is 1470 $\mu$m. The distance L5 between the left side of the exposing groove 63 and the optical filter 67 is 40 $\mu$m. The thickness L6 of the optical element substrate 67a is 705 $\mu$m. The thickness L7 of the thin film 67b is 17 $\mu$m. The thickness L6+L7 of the optical filter 67 is 722 $\mu$m.

Figure 20:
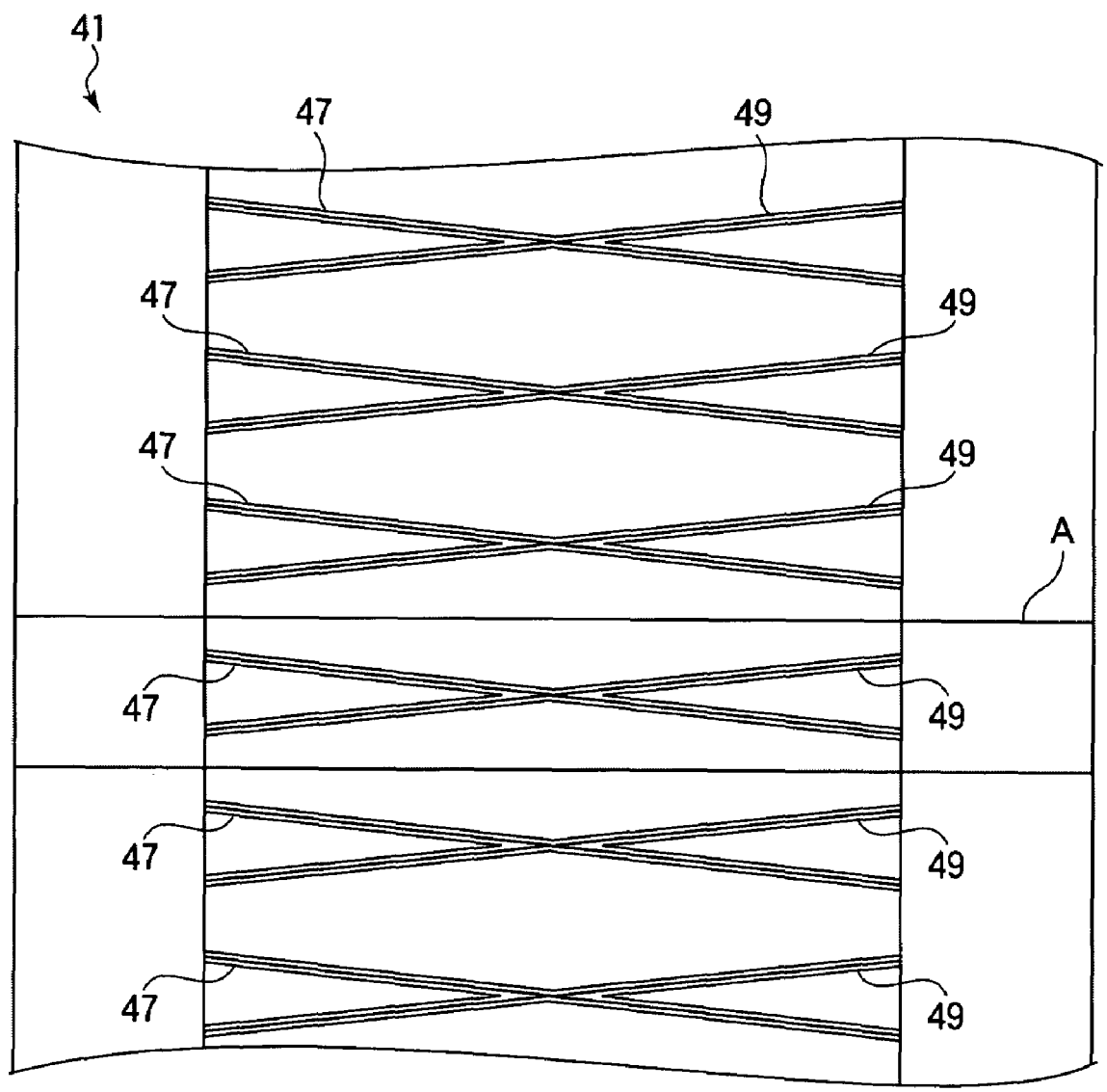
FIG. 20 shows a step for manufacturing an optical multiplexer/demultiplexer 40 as an optical component in the second mode for carrying out the invention.
Figure 21:
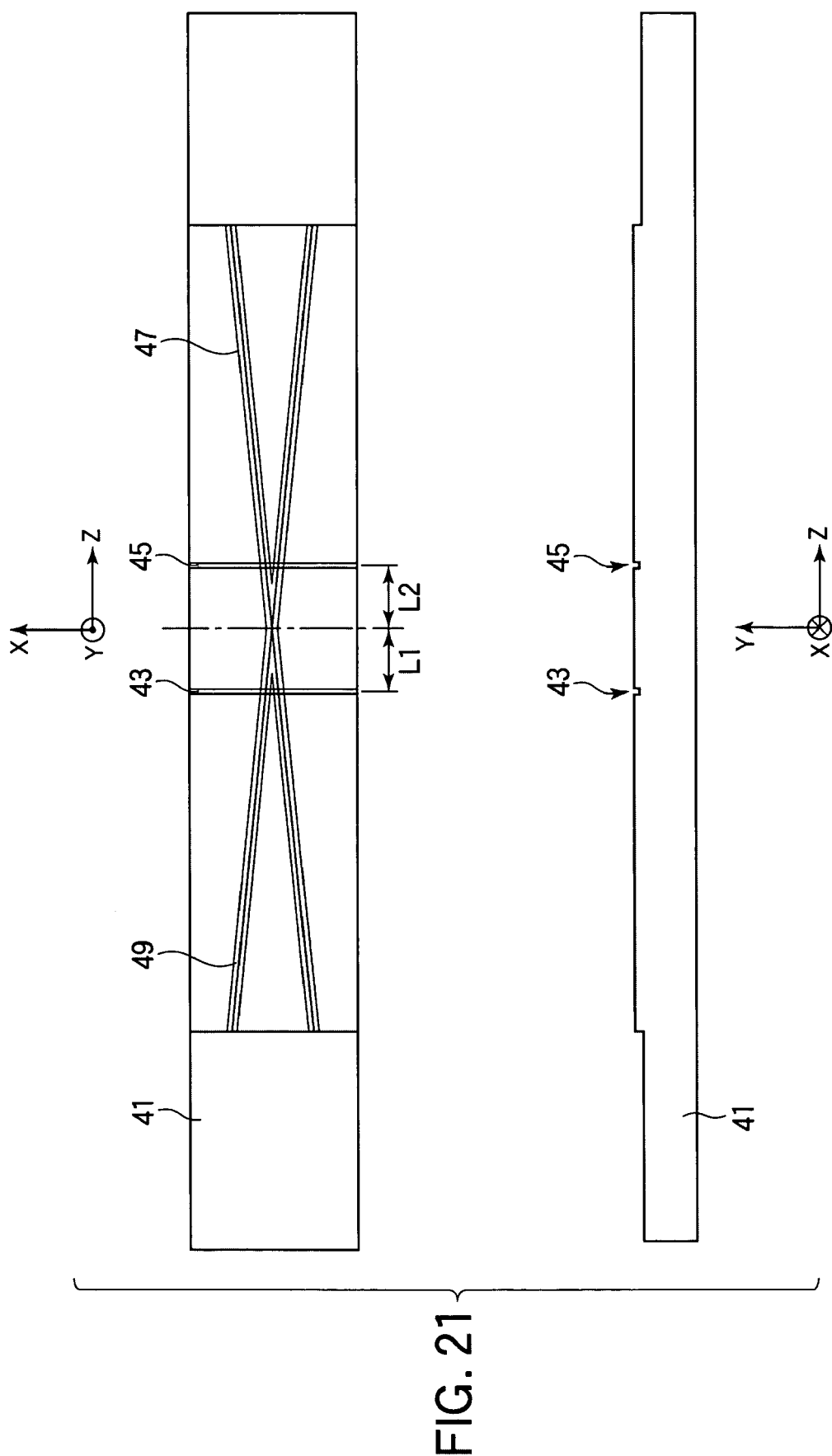
FIG. 21 shows a step for manufacturing the optical multiplexer/demultiplexer 40 as an optical component in the second mode for carrying out the invention.
Figure 22:
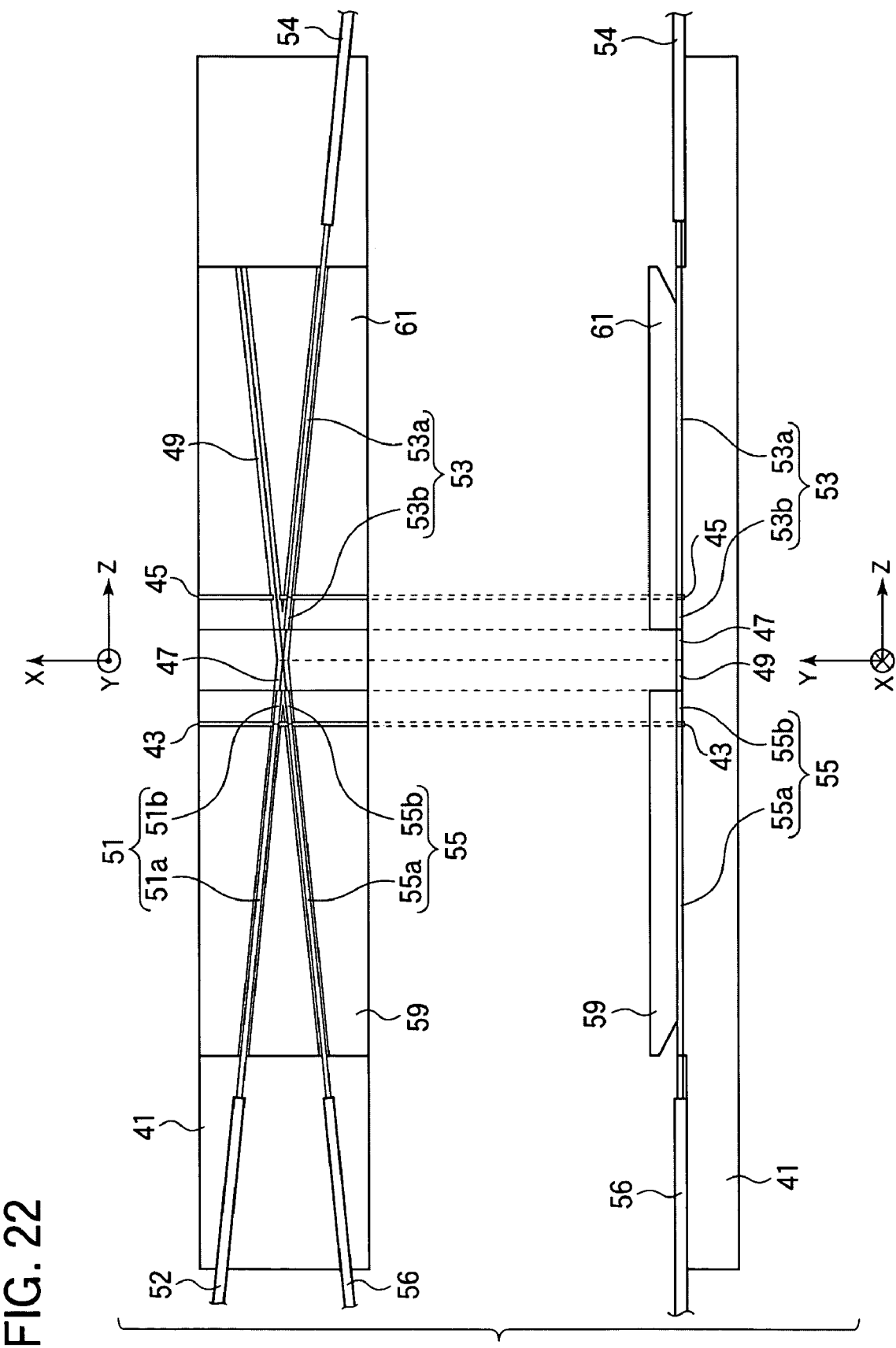
FIG. 22 shows a step for manufacturing the optical multiplexer/demultiplexer 40 as an optical component in the second mode for carrying out the invention.
Figure 23:
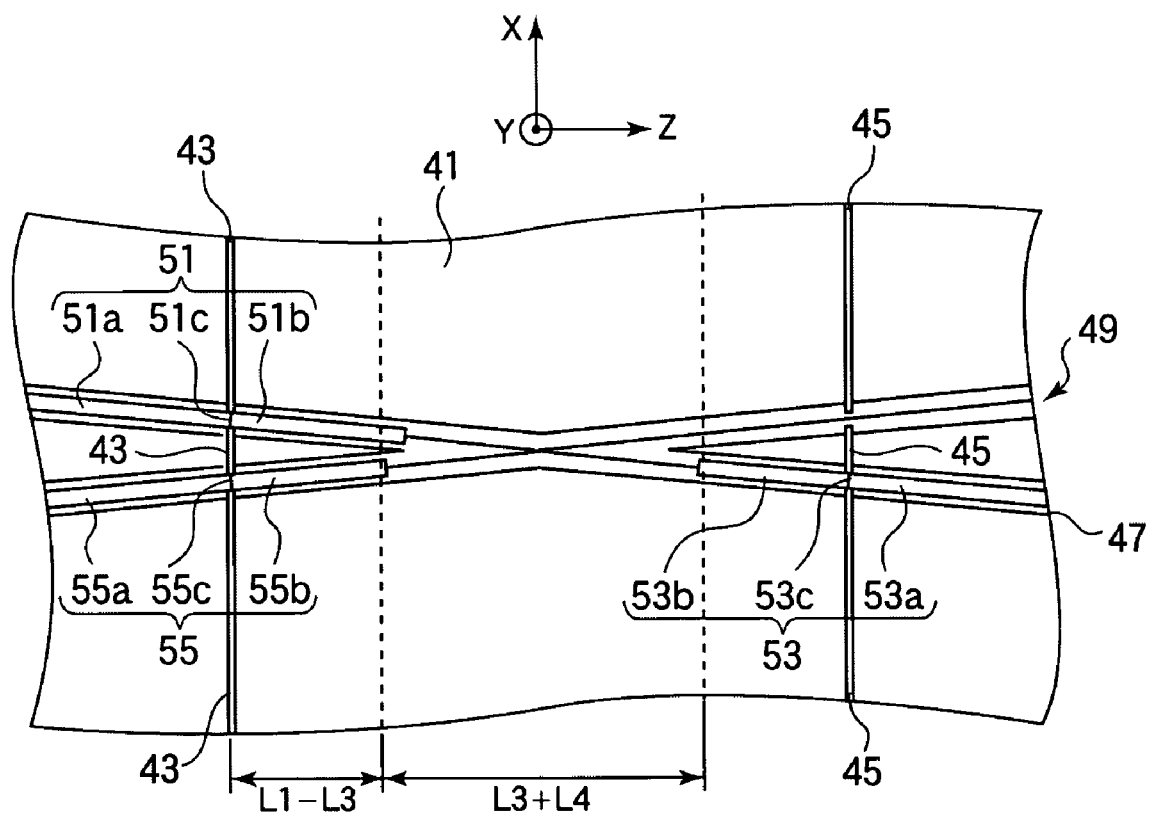
FIG. 23 shows a step for manufacturing the optical multiplexer/demultiplexer 40 as an optical component in the second mode for carrying out the invention.
Figure 24:
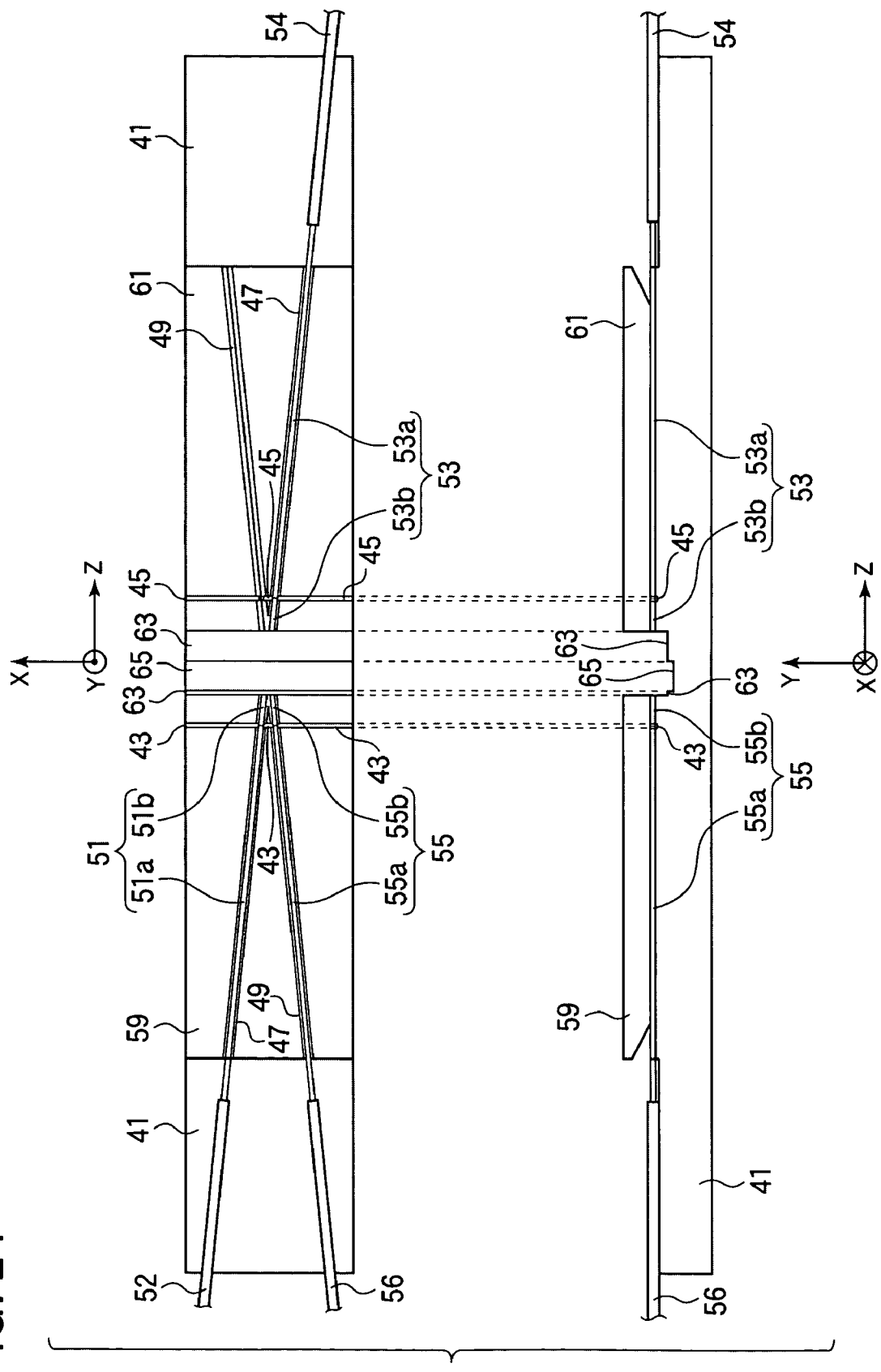
FIG. 24 shows a step for manufacturing the optical multiplexer/demultiplexer 40 as an optical component in the second mode for carrying out the invention.

A method of manufacturing an optical multiplexer/demultiplexer 40 will now be described with reference to FIGS. 20 to 24. FIG. 20 is a view of a substrate 41 taken in a direction normal to a surface on which first and second V-shaped grooves 47 and 49 are formed. FIGS. 21, 22, and 24 are enlarged views of the region in the rectangular frame A shown in FIG. 20. FIG. 23 shows the neighborhood of an intersection between the first and the second V-shaped grooves 47 and 49. The X-axis of the X-Y-Z coordinate system shown in FIGS. 21 to 24 extends in a direction across the direction in which light is transmitted by the optical multiplexer/demultiplexer 40 as shown in FIGS. 6A and 6B. The Y-axis extends in a direction which is orthogonal to the X-axis and which is orthogonal to the surface on which the first and the second V-shaped grooves 47 and 49 are formed. The Z-axis extends in the direction in which light is transmitted in an orthogonal relationship with each of the X-axis and Y-axis. The views in the upper parts of FIGS. 21, 22, and 24 show manufacturing steps of the optical multiplexer/demultiplexer 40 as viewed in the direction of the Y-axis, and the views in the lower parts show the manufacturing steps of the optical multiplexer/demultiplexer 40 as viewed in the direction of the X-axis. FIGS. 22 and 24 also show part of second and third optical fibers with a lens 53 and 55 which are disposed in the first and the second V-shaped grooves 47 and 49 and which are not visible in practice.

First, as shown in FIG. 20, a plurality of first V-shaped grooves 47 in the form of straight lines disposed in parallel with each other are formed on the substrate 41 which is formed from, for example, Tempax glass. For example, the first V-shaped grooves 47 are formed at a predetermined angle to a reference V-shaped groove (not shown) formed on the substrate 41. A plurality of second V-shaped grooves 49 in the form of straight lines are formed so as to extend across each of the plurality of first V-shaped grooves 47 at a relative angle of 11.6°. The first and the second V-shaped grooves 47 and 49 are formed using a slicer of high precision. Referring to the sectional configuration of the first and the second V-shaped grooves 47 and 49, they are formed in a V-like shape to have a groove width of about 200 μm on the surface of the substrate 41, a groove depth of about 177 μm, and an angle of about 60° in the apical part thereof, just like the V-shaped groove 3a in the first mode for carrying out the invention. Steps are then formed on both ends of the substrate 41.

Next, as shown in FIG. 21, the origin of the XYZ-coordinate system is set at the intersection between the first and the second V-shaped grooves 47 and 49, and a first positioning mark 43 is formed on the substrate 41 in a position at a distance L1=1519 μm from the origin in the negative (minus) direction of the Z-axis, the positioning mark being in the form of a straight line which is in parallel with the X-axis and which extends across the first and the second V-shaped grooves 47 and 49 at a predetermined angle. A second positioning mark 45 is then formed on the substrate 41 on the opposite side of the first positioning mark 43 with respect to the intersection and in a parallel and face-to-face relationship with the first positioning mark, the second positioning mark being in a position at a distance L2=1543 μm from the origin of the XYZ-coordinate system and being in the form of a straight line extending across the first and the second V-shaped grooves 47 and 49 at a predetermined angle. Referring to the sectional configuration of the first and the second positioning marks 47 and 49, they are formed in a concave shape having a groove width of about 30 μm and a groove depth of about 150 μm, just like the positioning mark 5 in the above-described mode for carrying out the invention. Since the optical fibers are cut with accuracy of about ±50 μm, it is desirable that the groove width of the first and the second positioning marks 47 and 49 is 100 μm or less.

Next, as shown in FIG. 22, an ultraviolet-setting resin (not shown) is applied to the substrate 41 except the first and the second V-shaped grooves 47 and 49 and the steps. An optical fiber securing plate 59 is then placed on the resin on the side of the first positioning mark 43, and an optical fiber securing plate 61 is placed on the resin on the side of the second positioning mark 45.

Next, a first optical fiber with a lens 51 is disposed in the first V-shaped groove 47 from a side of the optical fiber securing plate 59 that is faced toward an end of the substrate 41, with an end face of GIF 51b thereof directed toward the intersection. Then, a second optical fiber with a lens 53 is disposed in the first V-shaped groove 47 from a side of the optical fiber securing plate 61 faced toward another end of the substrate 41, with an end face of a GIF 53b thereof directed toward the intersection. A third optical fiber with a lens 55 is then disposed in the second V-shaped groove 49 from the side of the optical fiber securing plate 59 faced toward the end of the substrate 41, with an end face of a GIF 55b thereof directed toward the intersection. The sides of the optical fiber securing plates 59 and 61 faced toward the ends of the substrate 41 are provided with a predetermined angle to facilitate the insertion of the first through the third optical fibers with a lens 51, 53, and 55.

The optical fiber securing plates 59 and 61 are disposed in a face-to-face relationship with the substrate 41 using a resin while leaving such a gap that the first to the third optical fibers with a lens 51, 53, and 55 will not contact the optical fiber securing plates 59 and 61. Jackets 52, 54, and 56 of the first to the third optical fibers with a lens 51, 53, and 55 have an outer diameter greater than the outer diameter of the respective optical fibers. Because of the steps provided at the ends of the substrate 41, the first to third optical fibers with a lens 51, 53, and 55 are disposed in the same plane that is in parallel with the surface on which the first and the second V-shaped grooves 47 and 49 are formed.

Next, as shown in FIG. 23, optical fiber connecting surfaces 51c of the first optical fiber with a lens 51 are positioned based on the first positioning mark 43. Since the first and the second positioning marks 43 and 45 are formed in the form of concave grooves, they are visually perceived as two parallel straight lines when viewed in the direction of the Y-axis. The boundary of the optical fiber connecting surfaces 51c is positioned in the gap between the two parallel straight lines defined by the first positioning mark 43. Similarly, optical fiber connecting surfaces 53c of the second optical fiber with a lens 53 are positioned based on the second positioning mark 45. The boundary of the optical fiber connecting surfaces 53c is positioned in the gap between the two parallel straight lines defined by the second positioning mark 45. Similarly, optical fiber connecting surfaces 55c of the third optical fiber with a lens 55 are positioned based on the first positioning mark 43. The boundary of the optical fiber connecting surfaces 55c is positioned in the gap between the two parallel straight lines defined by the first positioning mark 43.

The GIFs 51b, 53b, and 55b are formed with a GIF length of about 800 μm+100 μm. Therefore, each of the GIF 51b, 53b, and 55b may protrude in a different length from the position where the exposing groove 63 is formed as indicated by the broken line in FIG. 23 toward the intersection between the first and the second V-shaped grooves 47 and 49.

Next, the resin is irradiated with ultraviolet light to be set, and the optical fiber securing plates 59 and 61 are thereby secured on the substrate 41. Thus, the first to the third optical fibers with a lens 51, 53, and 55 are secured in the first and the second V-shaped grooves 47 and 49.

Next, as shown in FIG. 24, an exposing groove 63 is formed, which extends in the direction of the X-axis in a position at a distance of L1−L3=796 μm from the first positioning mark 43 in the positive direction along the Z-axis, which includes the intersection between the first and the second V-shaped grooves 47 and 49, and which has a groove width of L3+L4=1470 μm and a groove depth of 400 μm. The ends of the GIFs 51b, 53b, and 55b protruding from the position where the exposing groove 63 is formed toward the intersection between the first and the second V-shaped grooves 47 and 49 are cut with the intersection when the exposing groove 63 is formed. Thus, end faces of the GIFs 51b and 55b are exposed on the left side of the exposing groove 63, and an end face of the GIF 53b is exposed on the right side of the exposing groove 63.

Next, a setting groove 65 is formed in the exposing groove 63 in a position at a distance of, for example, 30 μm from the left side of the exposing groove 63 in the positive direction of the Z-axis, the setting groove extending in the direction of the X-axis and having a groove width of 735 μm and a groove depth of 150 μm. The setting groove 65 is formed to have a groove width longer than the thickness of the optical filter 67 (not shown in FIG. 24) of L6+L7=722 μm such that the angle of the optical filter 67 can be adjusted.

Next, as shown in FIG. 7, the optical filter 67 is placed on the setting groove 65 with the optical element substrate 67a being directed to the ends of the GIFs 51b and 55b. A gap between an optical element substrate 67a and the left side of the exposing groove 63 is then filled with a resin 71. Then the gap between the optical element substrate 67a and the left side of the exposing groove 63 is adjusted to be a distance of L5=40 μm. Next, as shown in FIGS. 6A and 6B, an optical filter securing plate 57 is placed on the optical fiber securing plates 59 and 61 across the exposing groove 63. At this time, the optical filter securing plate 57 is shifted in the direction across the exposing groove 63 as occasion demands to adjust the angle of a light entrance surface of the optical filter 67, thereby allowing light from the first optical fiber with a lens 51 reflected by the optical filter 67 to be coupled to the end face of the GIF 55b in a preferable manner.

The resin 71 is then irradiated with ultraviolet light to set the resin 71. As a result, the optical filter 67 is secured in the setting groove 65 on a preliminary basis. Next, a thermosetting resin (not shown) is poured in the gap between the optical filter securing plate 57 and the optical fiber securing plates 59 and 61. The resin spreads throughout the gap due to capillarity. The resin is then heated along with the optical filter securing plate 57 and the optical fiber securing plates 59 and 61 and is set. Thus, the optical filter 67 is reliably secured in the setting groove 65. Next, a gap between a thin film 67b and the right side of the exposing groove 63 is filled with a silicon resin as a refractive index adjusting resin, and the silicon resin is heated to be gelatinized. An optical multiplexer/demultiplexer 40 as shown in FIGS. 6A and 6B is thus completed.

Figure 25:
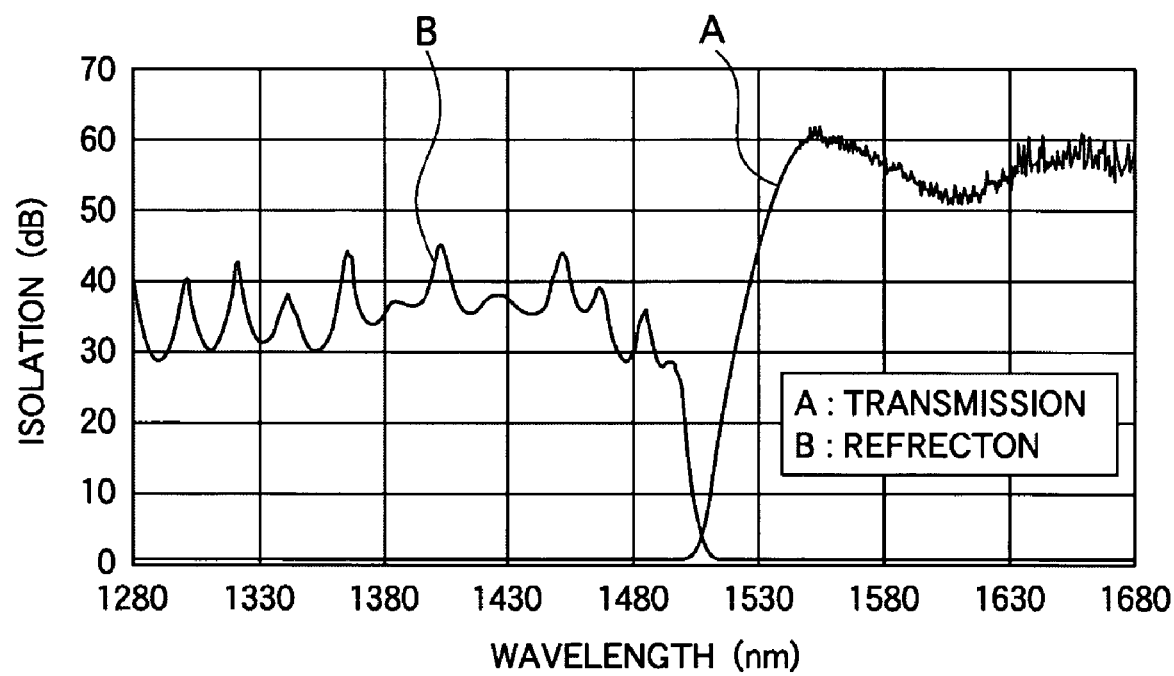
FIG. 25 shows optical characteristics of the optical multiplexer/demultiplexer 40 as an optical component in the second mode for carrying out the invention.

Optical characteristics of the optical multiplexer/demultiplexer 40 will now be described with reference to FIG. 25. The abscissa axis of FIG. 25 represents wavelengths of light (nm), and the ordinate axis represents attenuation (dB). In FIG. 25, the curve A indicates transmission characteristics, and the curve B indicates reflection characteristics. As shown in FIG. 25, the optical multiplexer/demultiplexer 40 has such transmission characteristics that light having a wavelength smaller than about 1500 nm is attenuated in a small amount and that light having a wavelength greater than about 1500 nm is attenuated in a greater amount. Further, the optical multiplexer/demultiplexer 40 has such reflection characteristics that light having a wavelength smaller than about 1500 nm is attenuated in a great amount and that light having a wavelength greater than about 1500 nm is attenuated in a smaller amount. Therefore, the optical multiplexer/demultiplexer 40 can transmit light having wavelengths of 1310 nm and 1490 nm and can reflect light having a wavelength of 1550 nm.

As described above, according to the method of manufacturing an optical component in the present mode for carrying out the invention, the first and the second positioning marks 43 and 45 extending across the first and the second V-shaped grooves 47 and 49 is formed on the substrate 41. The optical fiber connecting surfaces 51c and 55c can be positioned based on the first positioning mark 43, and the optical fiber connecting surfaces 53c can be positioned based on the second positioning mark 45. Therefore, the first to the third optical fibers with a lens 51, 53, and 55 can be properly and accurately set in a certain positional relationship with the optical filter 67 and the exposing groove 63. Since the first and the second positioning marks 43 and 45 can be formed in the same manner as described using a mechanical processing machine for forming the substrate 41 and the first and the second V-shaped grooves 47 and 49, the optical multiplexer/demultiplexer 40 can be manufactured without providing an additional apparatus for forming the first and the second positioning marks 43 and 45. It is therefore possible to suppress investment on facilities. Further, since a plurality of the high performance the first to the third optical fibers with a lens 51, 53, and 55 having uniform optical characteristics can be stably and simultaneously manufactured, an optical multiplexer/demultiplexer 40 can be provided at a low cost through an improvement of yield of manufacture.

The invention is not limited to the above-described modes for carrying out the same and may be modified in various ways.

The optical components in the first and the second modes for carrying out the invention have positioning marks 5, 43, and 45 having a concave groove-like section, but the invention is not limited to them. For example, the same advantages as those in the above-described modes for carrying out the invention can be achieved by positioning marks 5, 43, and 45 having a section in the form of a V-shaped groove or a section in the form of a groove having a semispherical bottom portion.

The optical components in the first and the second modes for carrying out the invention have positioning marks 5, 43, and 45 in the form of a groove, the invention is not limited by them. For example, a positioning mark having two parallel straight lines may alternatively be formed by patterning a predetermined film. In this case, the positioning mark may be formed with a thickness that is smaller than a height to which an optical fiber with a lens protrudes above a surface of a substrate when the optical fiber with a lens is set in a V-shaped groove. Thus, the optical fiber with a lens can be secured in the V-shaped groove in tight contact therewith using an optical fiber securing plate without interference with a positioning mark. As a result, the optical fiber with a lens will not be shifted in the V-shaped groove after being positioned, which makes it possible to form a GIF with a desired length and to thereby achieve the same advantages as those in the above-described modes for carrying out the invention.

The optical filter 67 of the optical component in the second mode for carrying out the invention is set in the setting groove 65, but this is not limiting the invention. For example, the optical filter 67 may be directly set in the exposing groove 63 without forming the setting groove 65 as long as a predetermined distance is kept between the left side of the exposing groove 63 and the light entrance surface of the optical filter 67, which allows the same advantages as those in the above-modes for carrying out the invention to be achieved.

An optical isolator 10 and an optical multiplexer/demultiplexer 40 were described as examples of optical components in the first and the second modes for carrying out the invention, but the invention is not limited to them. The invention is a technique for accurately positioning an optical fiber with a lens on a substrate and for accurately forming a GIF with a certain length, and it may be applied to any optical component utilizing an optical fiber with a lens, an optical switch, an optical circulator and optical attenuator.

In the methods of manufacturing an optical component in the first and the second modes for carrying out the invention, either manual positioning or automatic positioning may be performed to position the optical fiber connecting surfaces 7c.

What is claimed is:

1. An optical component comprising:
   a substrate;
   an optical fiber setting groove formed on the substrate to allow an optical fiber to be set therein;
   an optical fiber with a lens provided by connecting a single-mode optical fiber and a graded index optical fiber on an optical fiber connecting surface; and a positioning mark which is formed on the substrate across the optical fiber setting groove and which is used for positioning the optical fiber connecting surface.

2. An optical component according to claim 1, comprising a plurality of the optical fiber setting grooves, wherein the positioning mark is formed across the plurality of the optical fiber setting grooves.

3. An optical component according to claim 1, wherein the positioning mark is formed like a groove.

4. An optical component, comprising:
a substrate;
a first optical fiber setting groove for setting an optical fiber formed on the substrate along a first imaginary straight line in the plane of the substrate;
a second optical fiber setting groove formed on the substrate along a second imaginary straight line extending across the first imaginary straight line in the plane of the substrate;
a first positioning mark formed on the substrate at a predetermined distance from the intersection between the first and the second imaginary straight lines so as to extend across the first and the second optical fiber setting grooves;
a second positioning mark extending across the first and the second optical fiber setting grooves on the substrate at a predetermined distance from the intersection, the second positioning mark being disposed on the opposite side of the first positioning mark with respect to the intersection and in substantially parallel and face-to-face relationship with the first positioning mark;
three optical fibers with a lens provided by connecting a single-mode optical fiber and a graded index optical fiber on an optical fiber connecting surface and set in the first and the second optical fiber setting grooves with an end face of the graded index optical fiber directed toward the intersection, the optical fibers including a first optical fiber with a lens positioned based on the first positioning mark and set in the first optical fiber setting groove, a second optical fiber with a lens positioned based on the second positioning mark and set in the first optical fiber setting groove, and a third optical fiber with a lens positioned based on a first positioning mark and set in the second optical fiber setting groove;
an exposing groove which is provided in a position at a predetermined distance from the first positioning mark so as to include the intersection and in which an end face of the graded index optical fiber of each of the first to the third optical fibers with a lens is exposed in a position at a predetermined distance from the optical fiber connecting surface; and
an optical element set in the exposing groove to multiplex or demultiplex light which has propagated in and exited the first to the third optical fibers with a lens.

5. An optical component according to claim 4, wherein the first and the second positioning marks are formed like a groove.

6. A method of manufacturing an optical component comprising the steps of:
forming an optical fiber setting groove for setting an optical fiber on a substrate;
forming a positioning mark on the substrate across the optical fiber setting groove;
setting an optical fiber with a lens provided by connecting a single-mode optical fiber and a graded index optical fiber on an optical fiber connecting surface in the optical fiber setting groove; and
positioning the optical fiber connecting surface based on the positioning mark.

7. A method of manufacturing an optical component according to claim 6, comprising the step of cutting the graded index optical fiber in a position at a predetermined distance from the optical fiber connecting surface based on the positioning mark after the optical fiber connecting surface is positioned.

8. A method of manufacturing an optical component according to claim 6, wherein the positioning mark is formed like a groove.

9. A method of manufacturing an optical component according to claim 6, wherein the positioning mark is formed as two parallel straight lines sandwiching a boundary of the optical fiber connecting surface.

10. A method of manufacturing an optical component according to claim 9, wherein the optical fiber connecting surface is positioned in the gap between the two parallel straight lines.

11. A method of manufacturing an optical component according to claim 6, comprising the steps of:
forming a plurality of the optical fiber setting grooves on the substrate;
forming the positioning mark extending across the plurality of the optical fiber setting grooves on the substrate;
setting the optical fiber with a lens in each of the plurality of the optical fiber setting grooves; and
positioning each of a plurality of the optical fiber connecting surfaces based on the positioning mark.

12. A method of manufacturing an optical component according to claim 11, comprising the step of cutting each of the graded index optical fibers in a position at a predetermined distance from the optical fiber connecting surfaces of the respective one of the plurality of optical fibers with a lens based on the positioning mark after each of the optical fiber connecting surfaces of the plurality of the optical fibers with a lens is positioned.

13. A method of manufacturing an optical component, comprising the steps of:
forming a first optical fiber setting groove for setting an optical fiber on a substrate;
forming a second optical fiber setting groove extending across the first optical fiber setting groove on the substrate;
forming a first positioning mark extending across the first and the second optical fiber setting grooves on the substrate at a predetermined distance from the intersection between the first and the second optical fiber setting grooves;
forming a second positioning mark extending across the first and second optical fiber setting grooves on the substrate at a predetermined distance from the intersection, the second positioning mark being disposed on the opposite side of the first positioning mark with respect to the intersection and in substantially parallel and face-to-face relationship with the first positioning mark;
setting first to third optical fibers with a lens provided by connecting a single-mode optical fiber and a graded index optical fiber on an optical fiber connecting surface in the optical fiber setting grooves, the first and the second optical fibers with a lens being set in the first optical fiber setting groove, the third optical fiber with a lens being set in the second optical fiber setting groove, an end face of the graded index optical fiber of each of the optical fibers being directed toward the intersection;

positioning the optical fiber connecting surface of the first optical fiber with a lens based on the first positioning mark;

positioning the optical fiber connecting surface of the second optical fiber with a lens based on the second positioning mark;

positioning the optical fiber connecting surface of the third optical fiber with a lens based on the first positioning mark;

forming an exposing groove which is provided in a position at a predetermined distance from the first positioning mark so as to include the intersection and in which an end face of the graded index optical fiber of each of the first to the third optical fibers with a lens is exposed in a position at a predetermined distance from the respective optical fiber connecting surface; and setting an optical element for multiplexing or demultiplexing light which has propagated in and exited the first to the third optical fibers with a lens in the exposing groove.

14. A method of manufacturing an optical component according to claim 13, wherein at least any one of the first to the third optical fibers with a lens is cut simultaneously with the intersection such that the graded index optical fiber will have a predetermined length.

15. A method of manufacturing an optical component according to claim 13, wherein the first and the second positioning marks are formed like a groove.

16. A method of manufacturing an optical component according to claim 13, wherein the first and the second positioning marks are formed as two parallel straight lines sandwiching a boundary of the optical fiber connecting surface.

17. A method of manufacturing an optical component according to claim 16, wherein each of the optical fiber connecting surfaces of the first and the third optical fibers with a lens is positioned in the gap between the two parallel straight lines of the first positioning mark and wherein the optical fiber connecting surfaces of the second optical fiber with a lens is positioned in the gap between the two parallel straight lines of the second positioning mark.

* * * * *